United States Patent [19]

Matsuzaki et al.

[11] Patent Number: 4,508,443
[45] Date of Patent: Apr. 2, 1985

[54] LENS BARREL

[75] Inventors: Minoru Matsuzaki; Akihiko Hachimoto; Takashi Inoue, all of Hachioji; Hitoshi Shirai, Sagamihara; Akira Watanabe, Fuchu; Ikuo Tofukuji, Okaya, all of Japan

[73] Assignee: Olympus Optical Co., Ltd., Tokyo, Japan

[21] Appl. No.: 524,671

[22] Filed: Aug. 19, 1983

[30] Foreign Application Priority Data

Oct. 5, 1982 [JP] Japan .................. 56/175181

[51] Int. Cl.³ .............................................. G03B 3/00
[52] U.S. Cl. ................................... 354/402; 354/406; 354/195.1; 354/195.13; 354/286
[58] Field of Search ................ 352/140; 354/400, 402, 354/195.1, 195.13, 286

[56] References Cited

U.S. PATENT DOCUMENTS 4,178,087 12/1979 Shenk et al. .
4,299,457 11/1981 Ducommun .................. 352/140
4,348,089 9/1982 Shenk ........................... 354/400
4,359,276 11/1982 Tomori ......................... 354/400
4,400,075 8/1983 Tomori et al. ............... 354/286
4,404,595 9/1983 Ushiro et al. ................ 354/402
4,413,893 11/1983 Tomori ........................ 354/286
4,416,526 11/1983 Tomori et al. ............... 354/286

Primary Examiner—Russell E. Adams
Attorney, Agent, or Firm—Louis Weinstein

[57] ABSTRACT

A lens barrel is capable of selectively establishing a power focus mode in which an internally housed motor moves a taking lens to a position of any desired focal length, a single "auto-focus" mode in which the taking lens is moved to a position which is in focus to a stationary object being photographed, and a sequence "auto-focus" mode in which the taking lens is continuously moved in focus to a moving object being photographed. Any one of these modes is suitably selected by a mode changing switch. A movement of the taking lens in each mode is initiated by an operating member.

15 Claims, 37 Drawing Figures

LENS BARREL

BACKGROUND OF THE INVENTION

The invention relates to a lens barrel, and more particularly, to a lens barrel which may be mounted on a single lens reflex camera to allow a taking lens to be driven by a motor for the purpose of distance adjustment.

In an arrangement of the type described, the motor used is normally driven at a high rate in order to achieve a rapid distance adjustment. If the taking lens is driven at a high speed when moving toward its extreme positions, either toward the infinity or the nearest point, it is impossible to allow the taking lens to be stopped smoothly at such extreme position. Each time the lens is stopped at such position, it abuts against a stop to produce an offensive percussion sound and also applies an impact to the lens system. It is highly desirable to eliminate such difficulty by changing the drive applied to the lens to a lower rate immediately before an extreme position is approached. It will also be very useful to a user if a choice between a rough movement of the lens through a relatively large stroke and a fine movement of the lens through a limited stroke is enabled in a simple manner even in a region remote from the vicinity of the extreme positions.

A lens barrel is also known having an "auto-focus" function which allows a taking lens to be driven to an in-focus position in response to a signal representing the result of a distance measurement. If an object being photographed moves too rapidly, the movement of the lens fails to follow such movement of the object, disabling a focussing operation of the taking lens. Accordingly, it is desirable in such instance that a user be enabled to recognize this fact immediately. In an "auto-focus" lens employing a focussing sensor of TTL (through-the-taking lens) type, a parallax as experienced in the triangulation is avoided, and a distance measurement up to a very near point is enabled. However, it is also desirable that a user be allowed to recognize, as soon as possible, that an object being photographed is located at a distance which is less than that which lies within the reach of the focussing operation and hence the taking lens can no longer be controlled.

The recent trend is toward a multi-mode capability of the lens barrel, and hence it is desirable that the lens barrel be provided with as many functions as possible while substantially simplifying the operation and appearance thereof.

SUMMARY OF THE INVENTION

It is an object of the invention to provide a lens barrel which allows a motor, driving a taking lens, to be driven at a low rate whenever the lens approaches either infinity or the nearest extreme.

It is another object of the invention to provide a lens barrel which gives a warning and ceases to drive the motor when the taking lens reaches an extreme position such as the nearest point.

It is a further object of the invention to provide a lens barrel which gives a warning if an object being photographed moves too rapidly to allow the taking lens to follow such movement during an "auto-focus" operation.

It is an additional object of the invention to provide a lens barrel including an operating member which is used in common to cause a movement of the taking lens during a "power-focus" as well as an "auto-focus" operation.

It is still another object of the invention to provide a lens barrel including a single operating member which can be selectively used to cause a continuous movement or a discrete movement of the taking lens.

It is a still further object of the invention to provide a lens barrel having a sequence "auto-focus" mode in which a focus adjustment occurs continuously and which changes to a single "auto-focus" mode in which a discrete focus adjustment takes place in response to a release signal from an associated photographic camera.

In accordance with the invention, the movement of the taking lens can be stopped in a smooth manner at an extreme position. The lens barrel is provided with a variety of excellent functions while affording an ease of operation and a simple appearance.

DESCRIPTION OF PREFERRED EMBODIMENT

Figure 1:
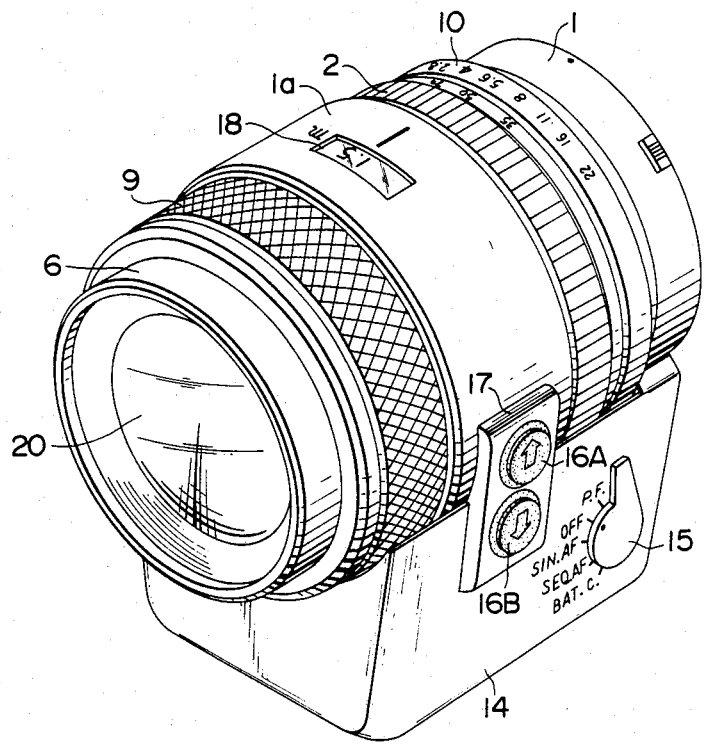
FIGS. 1 to 4 are a perspective view, a rear view, a side elevation and a schematic cross section of a lens barrel according to one embodiment of the invention.
Figure 2:
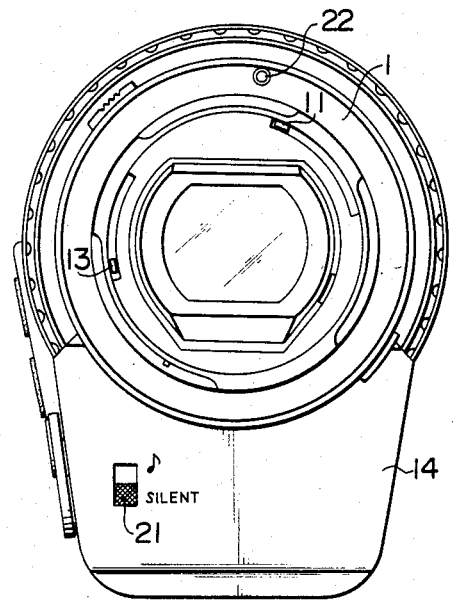

Referring to FIGS. 1 to 4, there is shown a lens barrel including a stationary frame 1 in which a zoom ring 2 is rotatably mounted. Rotation of the zoom ring 2 causes a pair of pins 4, 5 which engage cam grooves formed in a cam sleeve 3 to move in a direction along an optical axis O. The pin 4 is fixedly mounted on a sleeve 7 having a threaded portion which threadedly engages with a threaded portion on frame 6 for a front lens group by means of helicoid threads while the pin 5 is fixedly mounted on a frame 8 for a rear lens group. Thus, as the zoom ring 2 is rotated, both frames 6 and 8 move in accordance with the profile of the cam grooves along the optical axis O so as to change the focal length from a wide angle to telephoto lens. The front group lens frame 6 is threadedly engaged by a distance ring 9 by means of helicoid threads (not shown), and accordingly, rotation of the distance ring 9 causes the lens frame 6 to move along the optical axis O while rotating. A corresponding distance is indicated through an index window 18 formed in an outer sleeve 1a of the stationary frame 1 in accordance with the rotation of the distance ring 9. A diaphragm ring 10 is mounted on the stationary frame 1 toward its rear end, and as the diaphragm ring 10 is turned, a lever 11 (see FIG. 2) moves angularly to establish a number of diaphragm steps to be controlled. A plurality of diaphragm blades 12 mounted on the rear group lens frame 8 are controlled through a diaphragm lever 13 in response to an operation of a camera.

Within the lower portion of the body of the lens barrel, a casing 14 is integrally formed with the outer sleeve 1a of the stationary frame 1. A mode changeover switch 15 is disposed on the external surface of one side of the casing 14, and may be operated to select one of P.F. (power focus), OFF (turning the power supply off), SIN. AF (single "auto-focus"), SEQ. AF (sequence "auto-focus") and BAT. C (battery check) modes. An operating panel 17 carrying a pair of vertically aligned operating buttons 16A, 16B extends across the same external surface of the casing 11 and the outer sleeve 1a of the stationary frame 1, namely, at a medium elevation whih facilitates operating the lens barrel. The depression of these buttons 16A, 16B when the changeover switch 15 assumes its P.F. position allows them to operate as a P.F. UP button which causes the distance ring 9 to be turned in a near direction, namely, a direction toward the nearest point or a P.F. DN button which causes the distance ring 9 to be turned in a far direction, namely, a direction toward the infinity. When the mode changeover switch 15 assumes one of its SIN. AF and SEQ. AF positions, the depression of either button 16A or 16B allows them to operate as an AF. STAT (start of focussing operation) button which causes the distance ring 9 to be turned to an in-focus position. In this manner, operating buttons 16, 17 are used for both for the PF mode and the AF mode, thus providing an ease of operation and simplifying the appearance.

An in-focus trigger socket 19 is disposed on the surface of the casing 14 opposite the surface on which switch 15 is mounted. The purpose of the trigger socket 19 is to allow an in-focus signal to be derived externally whenever the taking lens 20 in the front group lens frame 6 reaches its in-focus position as a result of rotation of the distance ring 9. A cord connected to a motor drive or a winder may be connected with the socket 19 for triggering the motor drive or the winder in response to the in-focus signal. A sound switch 21 is mounted on the rear surface of the casing 14, and is turned on when the switch 21 is thrown to its up position, giving a variety of accoustical warnings. When such warning sound is to be muted, the switch may be thrown to its down or silent position, thus turning it off. It is to be noted that a signal pin 22 is provided on the mount surface of the stationary frame 1 of the lens barrel for transmitting a release signal from an associated, devoted camera whenever the lens barrel is mounted thereon.

Figure 4:
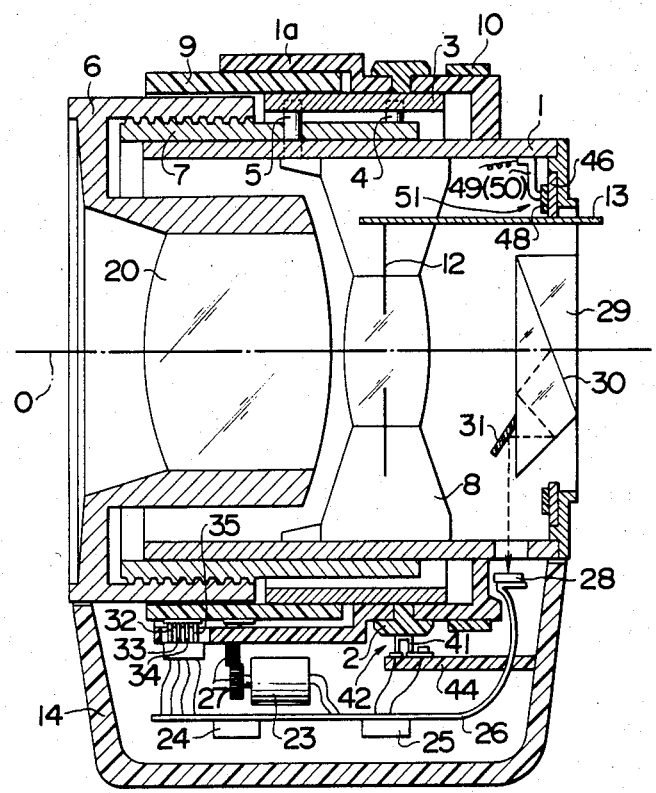

The casing 14 internally houses a flexible substrate 26 carrying a motor 23 and IC chips 24, 25 thereon, as shown in FIG. 4. The motor 23 is disposed in meshing engagement with the outer periphery of the distance ring 9 through a gear train 27 so that as the output shaft of motor 23 rotates, the distance ring 9 is turned to drive the taking lens 20. An in-focus sensor 28 comprising CCD is placed on the flexible substrate 26 rearwardly and upwardly within the casing 14. The in-focus sensor 28 has a light receiving surface which is disposed to receive light passing through the taking lens 20 and reflected by the half-mirror 30 of a prism 29 and internally reflected therein to be finally reflected by a reflecting mirror 31. It is to be understood that the light receiving surface of the sensor 28 is located in conjugate relationship with a film surface. In this manner, a distance measurement is made in response to TTL incident light.

Figure 5:
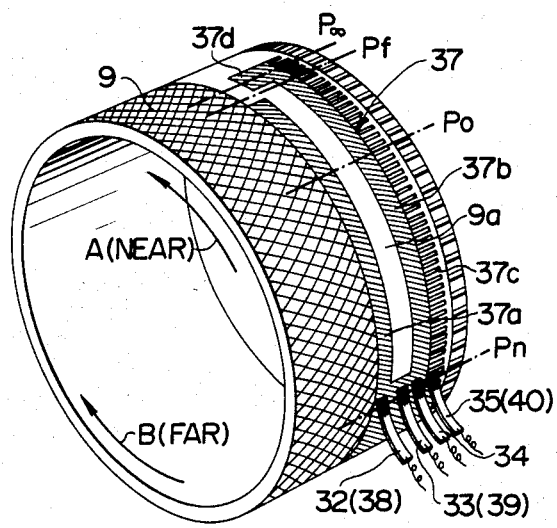
FIG. 5 is a perspective view of a distance ring shown in FIG. 1.

In a region surrounded by the casing 14, the stationary frame 1 carries four brush contacts 32 to 35 which are electrically connected to the substrate 26. As shown in FIG. 5, the contacts 32 to 35 are disposed in sliding contact with the outer periphery of the distance ring 9 toward the rear end thereof. At its rear region, the outer periphery of the distance ring 9 is formed with a conductive pattern 37, which comprises two substantially strip-shaped regions 37a, 37b and a comb-tooth region 37c which is contiguous with the strip-shaped region 37b. The contacts 32 to 35 are referred to as a zone 1, a zone 2, a common and an ADR (address) contact. Thus, a combination of contacts 32 and 34 form a first zone switch 38 while a combination of contacts 33 and 34 form a second zone switch 39. Finally, a combination of contacts 35 and 34 form an ADR switch 40.

When the distance ring 9 assumes an angular position which corresponds to a median distance zone, the contacts 32 to 35 engage the strip-shaped region 37a, an insulated region 9a, the strip-shaped region 37b and the comb-tooth region 37c, respectively, at location $P_0$ on the conductive pattern 37, for example. During the angular movement of the distance ring 9, the contacts 34 and 35 are maintained in contact with the strip-shaped region 37b and the comb-tooth region 37c, respectively, so that as the distance ring 9 is turned, the ADR switch 40 is turned on and off for each increment of the address. The contacts 32 and 33 engage the conductive pattern 37 differently depending on the angular position of the distance ring 9. When the distance ring 9 reaches the nearest focus point, the contacts 32 and 33 assume the same position Pn on the conductive pattern 37 as the contact 34. Accordingly, at this position, the zone switches 38 and 39 are both turned on. At the position $P_0$, the first zone switch 38 is turned on while the second zone switch 39 is turned off. Conversely, when the distance ring 9 has rotated to an angular position which is just before the position corresponding to infinity, the contacts 32 to 35 will be at a position Pf. It will be seen that the strip-shaped region 37a is does not extend to such position. Hence, the zone switches 38, 39 are both turned off at this position. When the distance ring 9 has rotated to an angular position corresponding to infinity, the contacts 32 to 35 will assume a position $P_\infty$. The strip-shaped region 37a is absent at such position, but a conductive region 37d integral with the strip-shaped region 37b is formed on an extension of the insulated region 9a. Accordingly, the first zone switch 38 is turned off and the second zone switch 39 is turned on at such position.

What has been mentioned in the immediately preceding paragraph means that the combination of the zone switches 38 and 39 may be used to define a unique Gray code for an angular position of the distance ring 9. Representing the turn-on and the turn-off condition of the zone switches 38, 39 by "0" and "1", respectively, it will be seen that a zone signal (00) corresponds to a zone represented by the nearest point Pn, a zone signal (01) corresponds to a zone represented by the position $P_0$, a zone signal (11) corresponds to a zone represented by the far position Pf and a zone signal (10) corresponds to a zone represented by the infinity position $P_\infty$. By reading such signal, it is possible to determine the angular position of the distance ring 9. In the lens barrel of the present invention, the motor is rotated at a high rate when the zone switches indicate a zone represented by the position $P_0$. When the distance changes from the $P_0$ zone to the Pf zone, the motor is driven at a low rate, and rotation of the motor is stopped when the zone represented by $P_\infty$ is reached. The rotation of the motor is also stopped when the distance moves from the $P_0$ zone into the $P_n$ zone. By driving the motor at a low rate in the $P_f$ zone, the movement of the distance ring 9 can be stopped smoothly in the $P_\infty$ zone, immediately before abutment against a stop. Alternatively, the motor may be driven at a low rate immediately before the distance ring moves into the nearest zone $P_n$. As a further alternative, the position $P_n$ may be chosen short of a nearest point stop, thus dispensing with a low rate region associated with the nearest point side.

Figure 6:
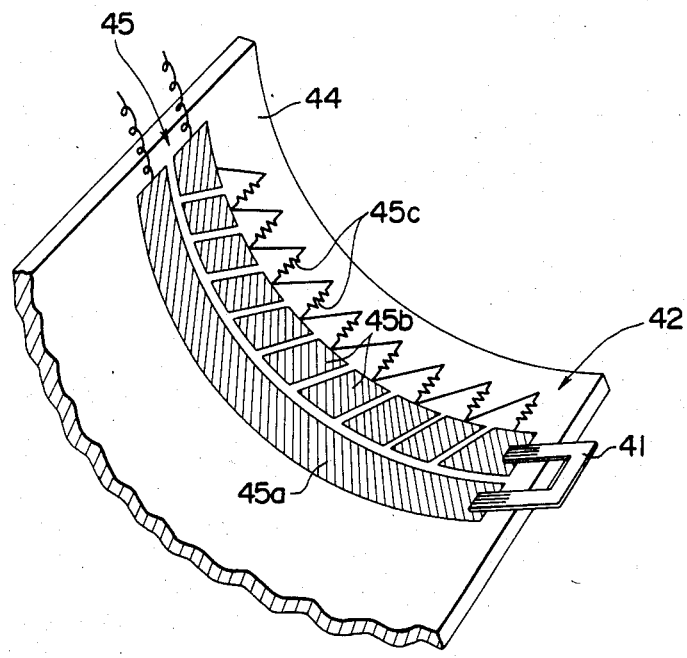
FIG. 6 is an enlarged perspective view of a zoom data detector shown in FIG. 4.

In a region surrounded by the casing 14, the zoom ring 2 is provided with a brush contact 41 on its outer periphery, and as shown in enlarged form in FIG. 6, the contact 41 cooperates with a conductive pattern 45 formed on a zoom substrate 44, which is integral with the casing 14, thus forming a zoom information detector 42. The conductive pattern 45 comprises a continuous single member conductive region 45a which is maintained in contact with the contact 41 independent of the angle of rotation of the zoom ring 2, and a plurality of conductive segments 45b spaced apart in a direction of rotation of the zoom ring, with adjacent segments being connected together by respective resistors 45c to enable a distinction of the angle of rotation. It will be seen that the conductive segments 45b are patterned to present a staggered form so that the contact 41 is always maintained in contact with at least one of the segments. The purpose of the zoom information detector 42 is to assure a proper distance adjustment for any angle of rotation of the zoom ring 2, and provides a signal indicative of focal length.

Figure 7A:
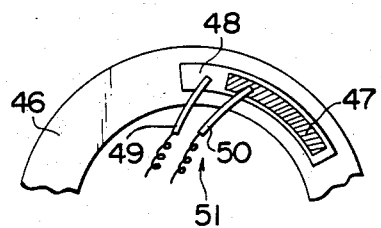
FIGS. 7A and 7B are front views of a diaphragm interlocked switch shown in FIG. 4 before and during a diaphragm controlling operation.
Figure 7B:
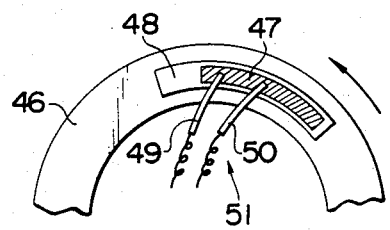

As shown in FIGS. 7A and 7B, a diaphragm ring 46 which is integral with the diaphragm lever 13 fixedly carries a substrate 48 having a conductive pattern 47 formed as shown. A pair of stationary contacts 49, 50 cooperate with the conductive pattern 47. When the diaphragm lever 13 is not operated to produce a reduced diaphragm aperture, at least one of the contacts, 49, engages an insulated portion of the substrate 48, thereby interrupting an electrical connection between the contacts 49 and 50. However, if the diaphragm lever 13 is operated even slightly to cause the diaphragm ring 46 to move angularly in a direction indicated by an arrow in FIG. 7B, the resulting movement of the substrate 48 together with the ring 46 allows an electrical connection between the contacts 49, 50 to be established. In this manner, the combination of the contacts 49, 50 form a diaphragm interlocked switch 51 which operates to detect a time interval during which the diaphragm is controlled. In this manner, it is possible to detect whether the camera is in a condition to take a picture or is going to be used to take a picture when the lens barrel is mounted on the camera. The purpose of using the diaphragm interlocked switch 51 is two-fold; first, to prevent the taking lens from being driven during a release operation, and second, to prevent any malfunctioning of the in-focus sensor 28 which would be caused by the failure of incidence of necessary light thereon whenever the diaphragm is controlled.

In addition to the features mentioned above, the lens barrel is provided with a variety of other functions, which will be described in further detail with respect to FIGS. 8A, 8B and subsequent Figures.

Figure 8A:
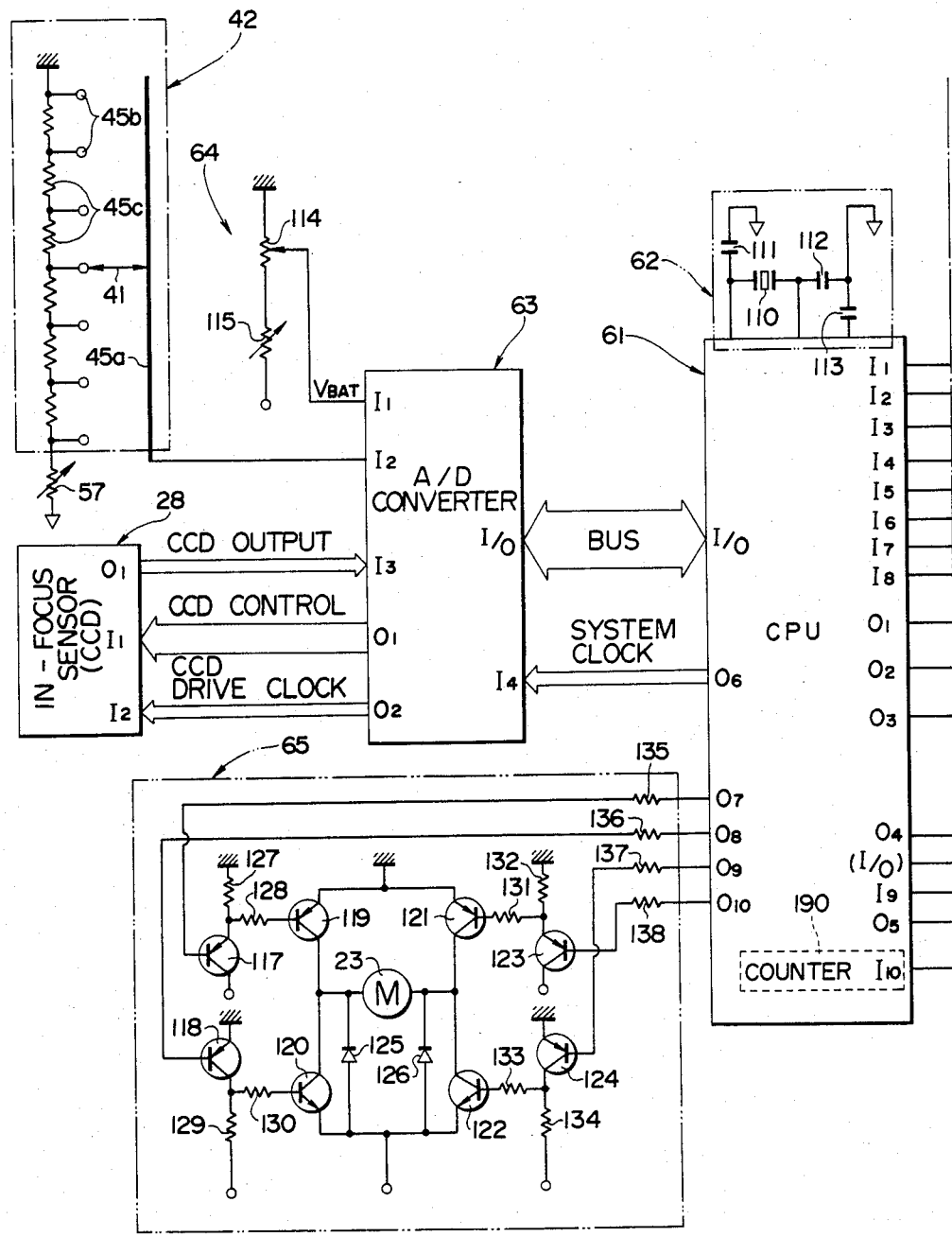
FIGS. 8A and 8B, taken together, show the circuit diagram of an electrical circuit contained within the lens barrel shown in FIG. 1.
Figure 8B:
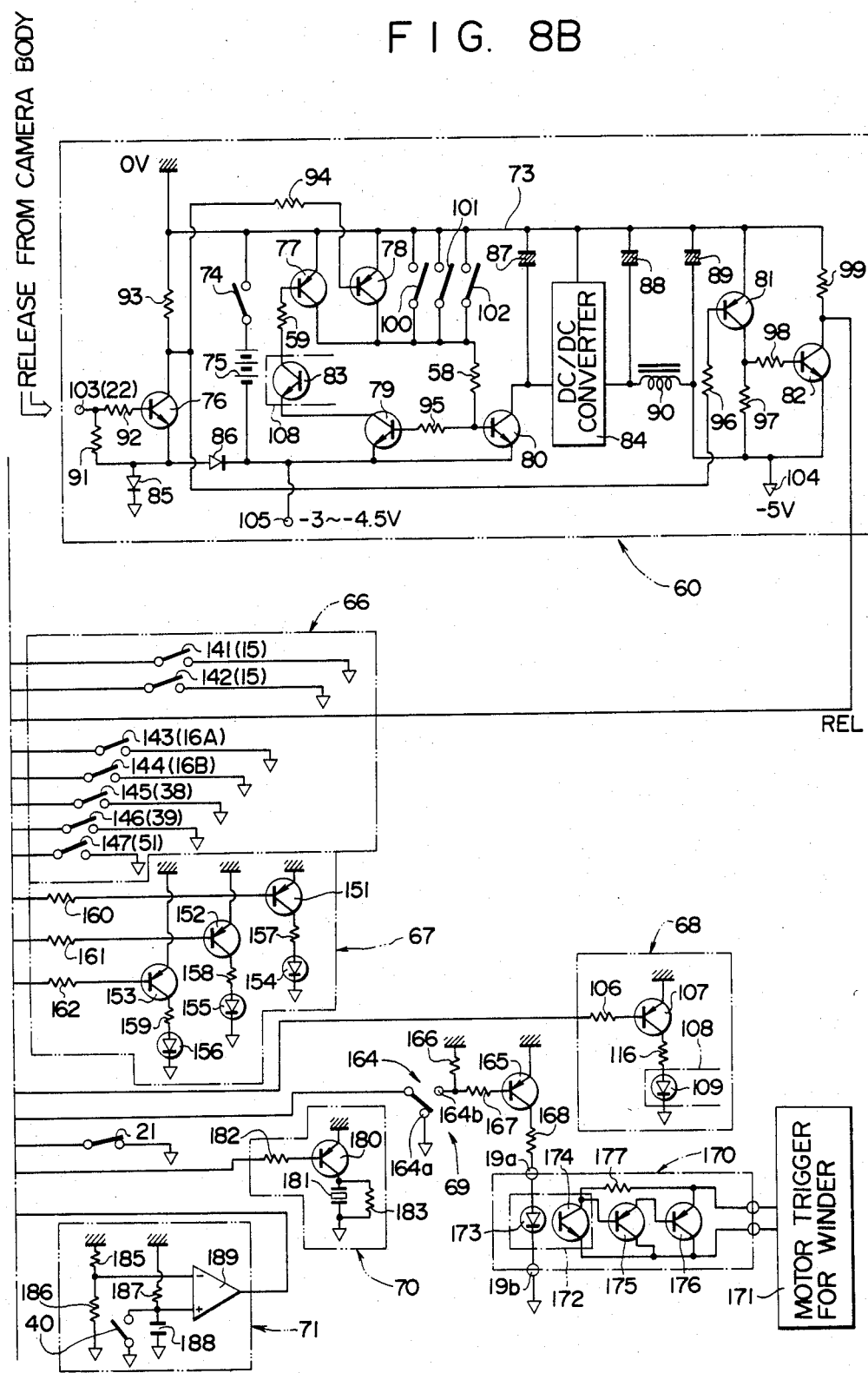

FIGS. 8A and 8B together comprise a circuit diagram of an electrical circuit which is contained within the casing 14 of the lens barrel. The electrical circuit essentially comprises a power supply circuit 60, a central processing unit (CPU) 61, an oscillator 62 externally associated with CPU 61, and A/D converter 63 which is coupled to CPU 61 through a bus, the in-focus sensor 28 supplying CCD outputs to the converter 63, the zoom information detector 42 having its conductive region 45a connected to an input terminal $I_2$ of the converter 63, a battery voltage detector 64 connected to an input terminal $I_1$ of the converter 63, a motor drive circuit 65 connected with output terminals $O_7$ to $O_{10}$ of CPU 61, a switch circuit 66 connected to input terminals $I_1$ to $I_8$ of CPU 61, a warning display 67 connected to output terminals $O_1$ to $O_3$ of CPU 61, a power supply sustain circuit 68 connected to an output terminal $O_4$ of CPU 61, an in-focus trigger circuit 69 connected to I/O terminal of CPU 61, a sound producing circuit 70 connected to an output terminal $O_5$ of CPU 61, and an ADR switch circuit 71 connected to an input terminal $I_{10}$ of CPU 61.

The power supply circuit 60 includes a power switch 74, a battery 75, transistors 76 to 82, phototransistor 83, DC/DC converter 84, diodes 85, 86, capacitors 87 to 89, a choke coil 90, resistors 58, 59, 91 to 99 and switches 100 to 102. A terminal 103 corresponds to the signal pin 22 and is used to transmit a release signal from a camera. A terminal 104 feeds a supply voltage of $-5$ V to CPU 61 and any circuit that is connected to CPU 61. A terminal 105 feeds a supply voltage from $-3$ to $-4.5$ V to the motor drive circuit 65 and the battery voltage detector 64.

Considering the construction of the power supply circuit 60 in detail, the terminal 103 which receives the release signal is connected through a resistor 92 to the base of an NPN transistor 76 and is also connected through a resistor 91 to the anode of a diode 85, the cathode of which is connected to the supply terminal 104. The transistor 76 has its emitter connected to the anode of the diode 85 and also connected through a diode 86 to the negative terminal of the battery 75, which terminal is connected to the supply terminal 105. The transistor 76 has its collector connected through a resistor 93 to a ground line 73 which is defined by the body of the apparatus. The power switch 74 is connected between the positive terminal of the battery 75 and the ground line 73. A pair of PNP transistors 77 and 78 have their emitters connected to the ground line 73 and have their collectors connected together and connected through a resistor 58 to the base of an NPN transistor 80. The base of the transistor 77 is connected through a resistor 59 to the collector of an NPN phototransistor 83, which is contained within a photocoupler 108. The emitter of the phototransistor 83 is connected to the collector of an NPN transistor 79, the base of which is connected through a resistor 95 to the base of the transistor 80. The emitter of the transistor 79 is connected to the negative terminal of the battery 75 together with the emitter of the transistor 80. The base of the transistor 78 is connected through a resistor 94 to the collector of the transistor 76. Switches 100, 101 and 102 are connected in parallel across the collector of the transistor 78 and the ground line. A capacitor 87 is connected across the collector of the transistor 80 and the ground line 73 in parallel relationship with a primary side of a DC/DC converter 84, across the secondary side of which is connected a capacitor 88. A series combination of a capacitor 89 and a choke coil 90 is connected between the negative terminal of the secondary side of the converter 84 and the ground line 73, with the junction between the capacitor 89 and the coil 90 being connected to the terminal 104. A PNP transistor 81 has its emitter connected to the ground line 73, and has its base connected through a resistor 96 to the collector of the transistor 76. The collector of the transistor 81 is connected through a resistor 97 to the terminal 104 and also connected through a resistor 98 to the base of an NPN transistor 82, the emitter of which is connected to the terminal 104 and the collector of which is connected through a resistor 99 to the ground line 73. The junction between the collector of the transistor 82 and resistor 99 is connected to an input terminal $I_3$ of CPU 61.

Figure 9:
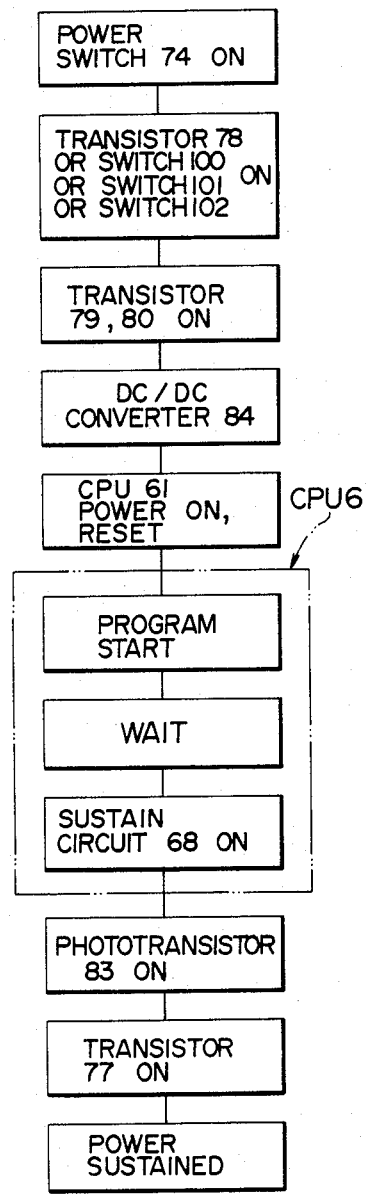
FIG. 9 is a flow chart illustrating the operation of a power supply circuit shown in FIG. 8.

The operation of the power supply circuit 60 is indicated by a flow chart shown in FIG. 9. It is to be understood that the power switch 74 is mechanically interlocked with the mode changeover switch 15 shown in FIG. 1, and is turned on whenever the changeover switch 25 is thrown to any position other than OFF position. Subsequently, when either the transistor 78 or one of the switches 100 to 102 is turned on, the transistors 79, 80 are turned on, initiating the operation of the DC/DC converter 84 to produce a supply voltage at the terminals 104, 105. The transistor 78 is adapted to be turned on in response to a release signal from an associated camera which is transmitted through the terminal 103. The switch 100 is turned on when the mode changeover switch 15 is thrown to BAT. C. (battery check) mode position. The switches 101 and 102 are mechanically interlocked with operating buttons 16A and 16B shown in FIG. 1. When a release signal from an associated camera is applied to the terminal 103, the transistor 76 is turned on to thereby turn the transistor 78 on. At this time, the transistors 81 and 82 are turned on, applying REL (release) signal to the input terminal $I_3$ of CPU 61.

When CPU 61 is fed with supply voltage from the power supply circuit 60, it is initially reset, followed by a program start. CPU 61 then activates the power supply sustain circuit 68 after a given time delay (wait) which is provided in order to prevent any malfunctioning thereof due to noises which occur during the power on process. The sustain circuit 68 comprises a PNP transistor 107 having its base connected through a resistor 106 to the output terminal $O_4$ of CPU 61, and LED (light emitting diode) 109, contained within the photocoupler 108 and having its anode connected through a resistor 116 to the collector of the transistor 107. The emitter of the transistor 107 is connected to the ground while the cathode of LED 109 is connected to the terminal 104. In response to a low level ("L" level) signal supplied from the output terminal $O_4$ of CPU 61 which is applied through the resistor 106, the transistor 107 is turned on to allow LED 109 to emit light. Light emitted by LED 109 impinges upon the phototransistor 83 located within the power supply circuit 60, thus turning it on. This in turn turns transistor 77 on, which is effective to maintain the transistors 79 and 80 on for a continued power supply if any one of the transistor 78 and switches 100 to 102 which has been initially turned on becomes turned off.

The oscillator 62 includes a crystal oscillator 110, oscillation capacitors 111, 112 and a capacitor 113 which is used to provide power on reset.

The A/D converter 63 has its I/O terminals connected with I/O terminals of CPU 61 through a bus, and also includes an input terminal $I_4$ which receives a system clock supplied from an output terminal $O_6$ of CPU 61. The converter 63 functions to effect analog-digital conversion in response to a signal fed from the zoom information detector 42 which represents the focal length and to a battery monitor voltage $V_{BAT}$ supplied from the battery voltage detector 64, which are applied to its input terminals $I_1$ and $I_2$, respectively.

The zoom information detector 42 includes a string of series resistors 45c, one end of which is connected to the ground and the other end of which is connected through a variable resistor 57 to the supply terminal 104. The contact 41 is adapted to always engage one of contacts 45b, which are connected to the opposite end of the string and to individual junctions between adjacent resistors of the string, and is connected to the conductive bar 45a which is connected to an input terminal $I_2$ of the converter 63. The battery voltage detector 64 includes a pair of variable resistors 114 and 115 connected in series across the supply terminal 105 and the ground, with a slidable tap on the variable resistor 114 being connected to the input terminal $I_1$ of the converter 63 to supply a monitor voltage $V_{BAT}$ proportional to the voltage across the battery 75 thereto.

The in-focus sensor 28 includes an output terminal $O_1$, which delivers a CCD output which is in turn applied to an input terminal $I_3$ of the converter 63 for purpose of A/D conversion. The sensor also includes input terminals $I_1$ and $I_2$, to which a CCD drive clock and a CCD control signal are respectively supplied from output terminals $O_1$, $O_2$ of the converter 63 for driving and controlling the sensor 28.

The motor drive circuit 65 includes the motor 23, transistors 117 to 124, diodes 125 and 126, and resistors 127 to 138. The drive circuit 65 is driven and controlled by outputs from CPU 61. Specifically, PNP transistors 117, 118, 123 and 124 have their bases connected through resistors 135 to 138, respectively, to output terminals $O_7$ to $O_{10}$, respectively, of CPU 61. The collectors of the transistors 117 and 123 are connected to the supply terminal 105, and the emitter of the transistor 117 is connected through a resistor 127 to the ground and also connected through a resistor 128 to the base of a PNP transistor 119. The emitter of the transistor 123 is connected through a resistor 132 to the ground and also connected through a resistor 131 to the base of a PNP transistor 121. The emitters of the transistors 118 and 124 are connected to the ground, and the collector of the transistor 118 is connected through a resistor 129 to the terminal 105 and also connected through a resistor 130 to the base of an NPN transistor 120. The collector of the transistor 124 is connected through a resistor 134 to the terminal 105 and also connected through a resistor 133 to the base of an NPN transistor 122. The emitters of the transistors 119 and 121 are connected to the ground while the emitters of the transistors 120 and 122 are connected to the terminal 105. The collectors of the transistors 119 and 120 are connected to one terminal of the motor 23 while the collectors of the transistors 121 and 122 are connected to the other terminal of the motor 23. Diodes 125, 126 have their cathodes connected to the opposite terminals of the motor 23 and have their anodes connected to the terminal 105.

In operation, when an "L" level signal is delivered from the output terminals $O_7$ and $O_9$ of CPU 61, the transistors 117 and 124 are turned on, whereby the motor 23 rotates in a direction to turn the distance ring 9 toward the nearest point. Conversely, when an "L" level signal is delivered from the output terminals $O_8$ and $O_{10}$, the transistors 118 and 123 are turned on, whereby the transistors 120 and 121 are turned on to cause the motor 23 to rotate in the opposite direction or in a direction to turn the distance ring 9 toward the infinity. When signals present on the output terminals $O_8$ and $O_9$ both change to "L" level during the time the motor 23 is in motion, the transistors 118 and 124 are turned on to cause the transistors 120 and 122 to be turned on, thereby applying a braking effort to the motor 23. More specifically, at this time, the motor 23 is short-circuited by a combination of transistor 120 and diode 126 or a combination of transistor 122 and diode 125, to be stopped rapidly.

The switch circuit 66 includes a bank of switches 141 to 147 which are connected between input terminals $I_1$, $I_2$, $I_4$ to $I_8$, respectively, of CPU 61 and the terminal 104. The switches 141 and 142 are used to determine modes other than OFF of the mode changeover switch 15, thus determining each of P.F., SIN. AF., SEQ. AF., and BAT. C. modes by a combination of on and off conditions of the switches 141 and 142. The switches 143 and 144 are closed by the operating buttons 16A and 16B, respectively, shown in FIG. 1. The switches 145 and 146 represent the first and the second zone switch 38 and 39, respectively, shown in FIG. 5. The switch 147 represents the diaphragm interlocked switch 51 shown in FIGS. 7A and 7B.

The warning display 67 comprises transistors 151 to 153, LED's 154 to 156 and resistors 157 to 162. Specifically, the base of each of PNP transistors 151 to 153 is connected through a resistor 160 to 162, respectively, to an output terminal $O_1$ to $O_3$, respectively, of CPU 61. The collector of each of these transistors is connected through a resistor 157 to 159, respectively, to the anode of LED 154 to 156, respectively. The emitter of each transistor is connected to the ground while the cathode of each of LED 154 to 156 is connected to the supply terminal 104. In response to an "L" level at an associated one of output terminals $O_1$ to $O_3$ of CPU 61, each transistor 151 to 153 is turned on, allowing an associated one of LED 154 to 156 to emit light for purpose of display.

Specifically, the first LED 154 emits light to give a warning to a user that an object being photographed moves too rapidly to allow a focussing operation to follow such movement of the object. The second LED 155 emits light to give a warning for a nearest limit, indicating that the taking lens is brought too close to an object being photographed to permit a distance adjustment. The third LED 156 emits light to give a warning indicating that the contrast of an object being photographed is too low to permit a distance adjustment. Such warning is given at the extreme level of contrast. A low light warning is given when the first and the second LED's 154, 155 are turned on simultaneously. Thus, when an object being photographed is under an insufficient illumination to supply a required amount of light to the in-focus sensor 28, an accurate focussing operation is not assured. In such instance, the emission of light from both LED's 154, 155 permits a warning to be given to a user. In this manner, the warning display 67 gives four kinds of warnings by utilizing three LED's 154 to 156. Such warning can be recognized by a user when he views the finder of the camera.

Figure 3:
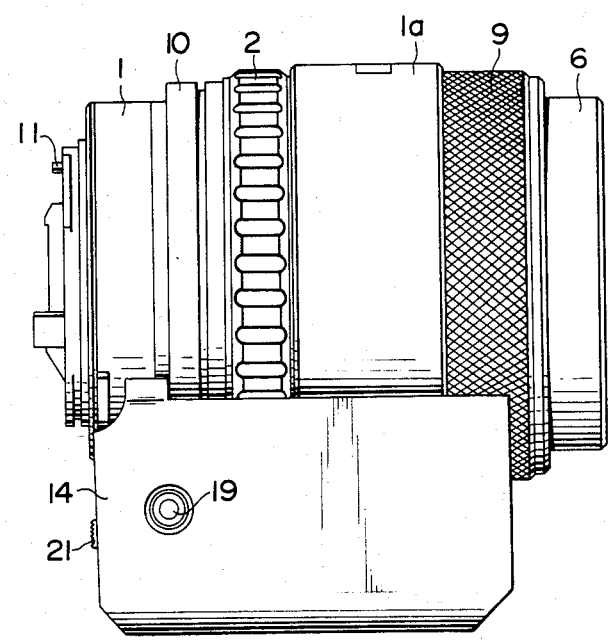

The in-focus trigger circuit 69 includes a changeover switch 164 connected to a terminal (I/O) of CPU 61, a transistor 165, resistors 166 to 168 and contacts 19a, 19b of the in-focus trigger socket 19 shown in FIG. 3. The switch 164 has a contact 164a connected to the terminal 104, and a contact 164b which is connected through a resistor 166 to the ground and also connected through a resistor 167 to the base of the transistor 165. The transistor 165 has its emitter connected to the ground and its collector connected through a resistor 168 to the contact 19a of the trigger switch 19. The other contact 19b of the trigger switch 19 is connected to the terminal 104.

An in-focus trigger cord 170 is connected to the contacts 19a and 19b by using a plug which is inserted into the socket 19, thus connecting a motor trigger circuit 171 associated with a winder to the trigger socket 19 through the cord 170. The cord 170 includes a photocapsule 172 including an LED 173 having its anode and cathode connected to the contacts 19a and 19b of the trigger socket 19. The photocapsule 172 also includes an NPN phototransistor 174 which has its collector connected to the base of a PNP transistor 175 and also connected through a resistor 177 to the emitter of a PNP transistor 176. The base of the transistor 176 is connected to the emitter of the transistor 175 while the collector of the transistor 176 is connected to the emitter of the phototransistor 174 and to the collector of the transistor 175. The emitter and the collector of the transistor 176 provides terminals of the trigger cord 170 for connection with the motor trigger circuit 171. When the trigger cord 170 is not inserted into the socket 19, the changeover switch 164 is thrown to the contact 164a. However, when the trigger cord 170 is inserted, the tip of the plug associated with the trigger cord 170 causes the changeover switch 164 to be switched to the contact 164b, whereby the transistor 165 is connected with the terminal (I/O). CPU 61 is capable of detecting such switching of the changeover switch 164. Accordingly, when the winder is connected through the trigger cord 170, the transistor 165 is turned on when an in-focus condition is reached, whereupon LED 173 in the photocapsule 172 of the trigger cord 170 emits light to turn the phototransistor 174 on, causing the transistors 175 and 176 to be turned on to activate the motor trigger circuit 171, thus causing the winder to effect a shutter release and a winding operation.

The sound producing circuit 70 includes a PNP transistor 180, a piezoceramic vibrator (PCV) 181 and resistors 182 and 183. The transistor 180 has its base connected through the resistor 182 to an output terminal $O_5$ of CPU 61 and has its emitter connected to the ground. The collector of the transistor is connected to the supply terminal 104 through a parallel combination of PCV 181 and resistor 183. When an "L" level signal is delivered from the output terminal $O_5$ of CPU 61, the transistor 180 is turned on to activate PCV 181 for producing a warning sound. The production of such warning sound may be disabled by the sound switch 21 shown in FIG. 2. In this instance, the sound switch 21 which is connected to an input terminal $I_9$ of CPU 61 is opened.

The ADR switch circuit 71 includes the ADR switch 40 shown in FIG. 5, resistors 185 to 187, a capacitor 188 which protects against chattering, and a waveform shaping comparator 189. The comparator 189 has an inverting input which is connected to the junction between the resistors 185 and 186 which are connected in series across the supply terminal 104 and the ground. The non-inverting input of the comparator 189 is connected to the junction between the resistor 187 and ADR switch 40 which are connected in series across the terminal 104 and the ground. The capacitor 188 is connected in shunt with the switch 40. The output terminal of the comparator 189 is connected to an input terminal $I_{10}$ of CPU 61, which represents an input terminal to an ADR counter 190 which is formed within CPU 61. As a consequence, when the ADR switch 40 is turned on and off for each increment of the address as the distance ring 9 moves angularly, a number of pulses (ADR) which correspond to the angle through which the distance ring 9 has moved is delivered from the comparator 189 and is counted by the ADR counter 190, which thus detects the angle through which the distance ring 9 has rotated.

Figure 10:
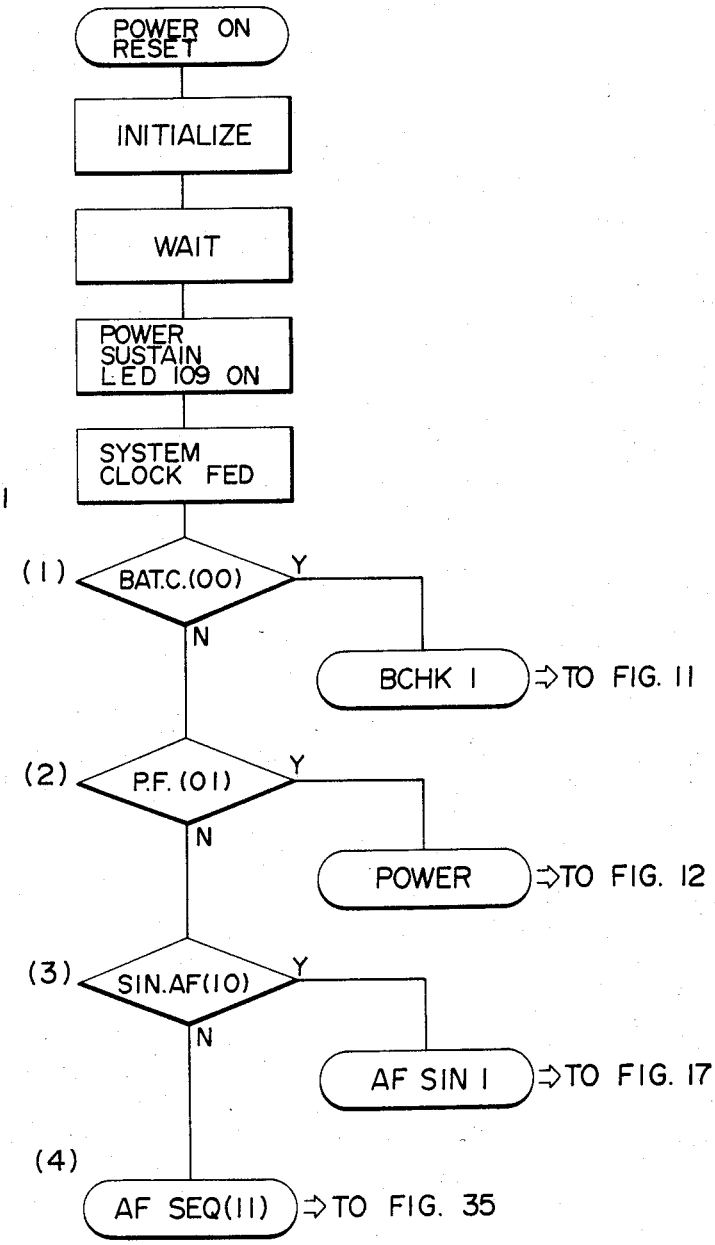
FIGS. 10 to 35 are flow charts illustrating programmed operations of the CPU shown in FIG. 8.

The operation of the electrical circuit incorporated within the lens barrel will now be described in detail with reference to flow charts shown in FIG. 10 and subsequent Figures, which show programs stored in CPU 61. As mentioned previously, when the mode changeover switch 15 is turned to any mode other than OFF, the power switch 74 is turned on, whereby the power is supplied to CPU 61 (power on) and the circuit is reset as indicated in FIG. 10. This initializes CPU 61, clearing all flags. After a given time delay (wait) which is provided to avoid a malfunctioning caused by the instability of the power supply, a power supply sustain condition is established, turning LED 109 in the sustain circuit 68 on. The output terminal $O_6$ of CPU 61 then supplies a system clock to the input terminal $I_4$ of the A/D converter 63. The mode changeover switch 15 then determines which mode has been selected. As mentioned previously, BAT. C. mode corresponds to (00), P.F. mode corresponds to (01), SIN. AF mode corresponds to (10) and SEQ. AF mode corresponds to (11) code for the established on and off conditions of the mode switches 141 and 142 in the switch circuit 66. If BAT. C. mode is selected, the program branches to BCHK 1 routine for a battery check operation. If P.F. mode is selected, the program branches to POWER routine for a power focussing operation. If SIN. AF mode is selected, the program branches to AFSIN 1 routine for a single AF 1 operation. If SEQ. AF mode is selected, the program branches to AF SEQ. routine for a sequence AF operation. The operation in each mode will now be specifically described.

Figure 11:
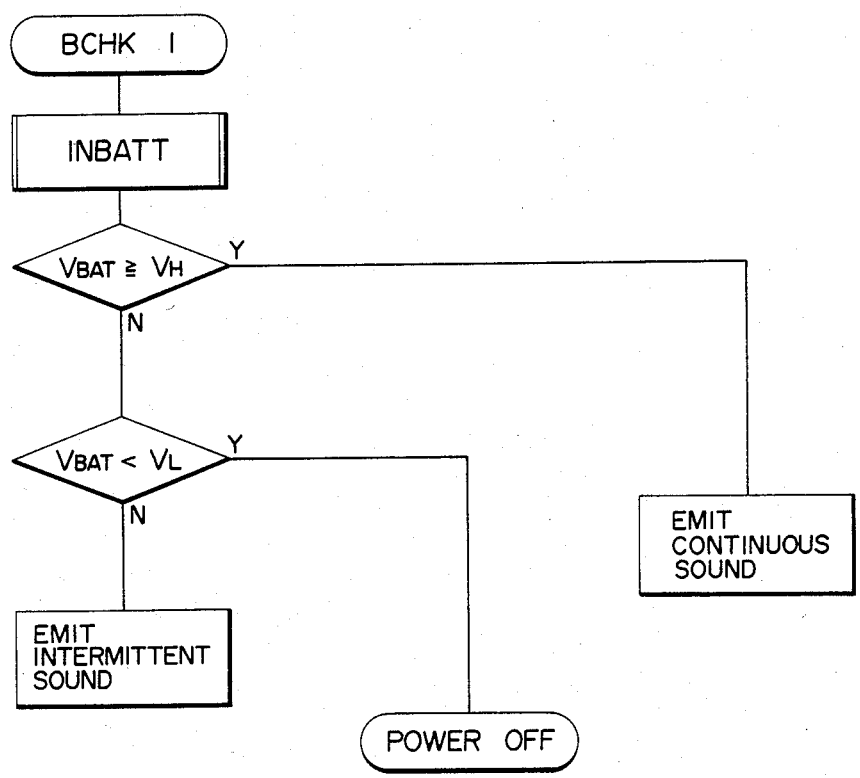

(1) When BAT. C. mode is selected, CPU 61 initially performs an INBATT operation as indicated in FIG. 11. Specifically, a monitor voltage $V_{BAT}$ from the detector 64 as converted into digital form is fetched into CPU 61. The voltage $V_{BAT}$ is compared against given voltages $V_H$, $V_L$ ($V_H > V_L$). If the voltage $V_{BAT}$ is higher than the voltage $V_H$ of a magnitude which is sufficient to drive the circuit, the sound producing circuit 70 produces a sound continuously. If the voltage $V_{BAT}$ is less than the voltage $V_H$, but is higher than the voltage $V_L$ of a magnitude which is just sufficient to drive the circuit, the circuit 70 produces a sound intermittently. Such sound can be recognized by a user to determine if the battery 75 has a sufficient voltage output or if it is now time to change the battery 75. If the monitor voltage $V_{BAT}$ is less than the voltage $V_L$, a power off condition is established, which is indicated by an "H" level on the output terminal $O_4$ of CPU 61 to deactivate the power supply sustain circuit 68, thus ceasing the emission of light from LED 109, since such monitor voltage may cause a malfunctioning.

Figure 12:
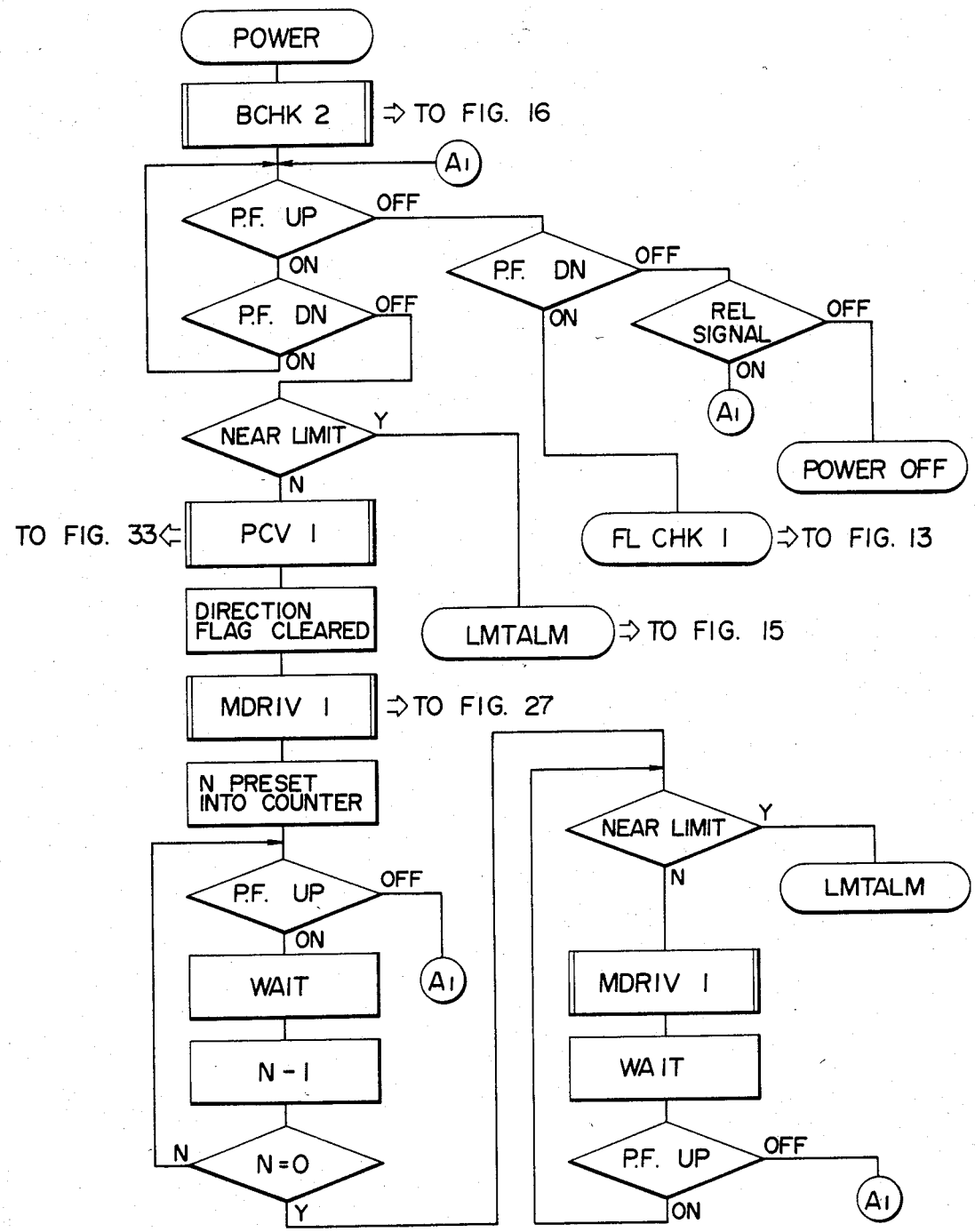
Figure 16:
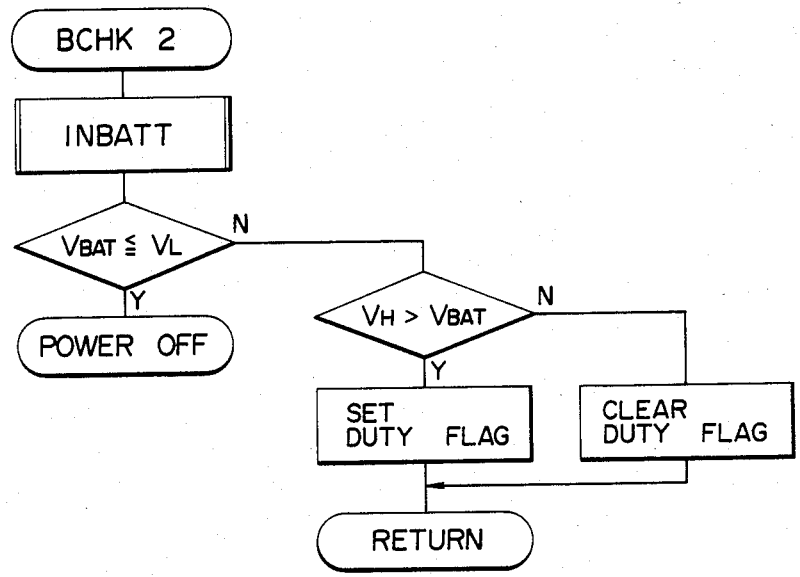

(2) When P.F. (power focus) mode is selected, FIG. 10 indicates that the program branches to a POWER routine shown in FIG. 12. Initially, a battery check operation BCHK 2 operation takes place. As illustrated in FIG. 16, the battery check operation BCHK 2 begins with the INBATT operation, followed by a comparison of the monitor voltage $V_{BAT}$ against the voltage $V_L$. If $V_{BAT} \leq V_L$, the power off condition is established as in the BAT. C. mode. On the contrary, if $V_{BAT} > V_L$, the voltage $V_{BAT}$ is then compared against the voltage $V_H$. If it is found that $V_L < V_{BAT} < V_H$, a DUTY flag is set to "1", while if $V_H \leq V_{BAT}$, the DUTY flag is cleared, then returning to FIG. 12.

Figure 15:
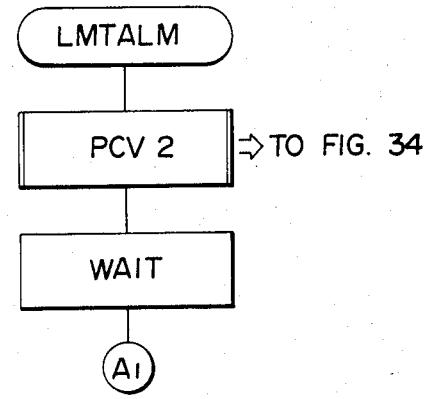
Figure 34:
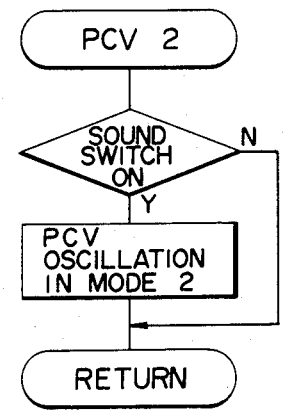

Then a decision is made to see if the operating button 16A for P.F. UP or the operating button 16B for P.F. DN has been depressed. Assuming that the switch 143 (P.F. UP) is turned on while the switch 144 (P.F. DN) has been turned off, the distance ring 9 is rotated in a near direction, namely, a direction toward the nearest point, and thus a decision is made to see if a position Pn corresponding to the nearest point or the near limit as shown in FIG. 5, is reached. If the near limit is reached, a limit warning LMTALM shown in FIG. 15 is given. The limit warning LMTALM is given by activating the sound producing circuit 70 if the sound switch 21 is turned on and allowing PCV 181 to produce a long lasting "whistle" tone in oscillation 2 mode to give a warning, followed by a time delay (wait) to return to $A_1$, as indicated in PCV 2 routine shown in FIG. 34. At this time, a warning is also given in terms of the emission of light from LED 155 shown in FIG. 8.

Figure 33:
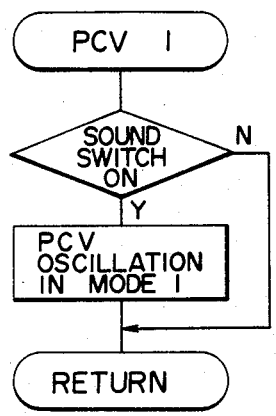

If the near limit is not reached, the program branches to PCV 1 routine shown in FIG. 33 where the sound producing circuit 70 is activated if the sound switch 21 is turned on, causing PCV 181 to produce a "pip" tone of a short duration in oscillation 1 mode. If the sound switch 21 is turned off, the operation returns to the main program without producing any sound. Subsequently, a direction flag is cleared, transferring to MDRIV 1 routine (see FIG. 27) to drive the motor. The motor is then driven by 1ADR toward the nearest point, and a count N is preset in the counter 190, which is defined by the software, followed by a decision to see if the switch 143 is turned on or off. If the switch is off, the operation returns to $A_1$ while if it is on, a time delay (wait) is allowed before counting (N−1). This process is repeated until N=0, whereupon a decision is again made to see if the near limit is reached. Thus, if the switch 143 is turned off before N becomes equal to 0, the operation returns to the exit $A_1$. On the other hand, if the switch 143 remains on until after N=0, next a decision is made to see if the near limit is reached. If the near limit is reached, the limit warning LMTALM is given, and if the near limit is not reached, the motor drive MDRIV 1 occurs and is followed by a time delay (wait), and the motor drive MDRIV 1 operation is performed until the near limit is reached, as long as P.F. UP occurs.

Figure 27:
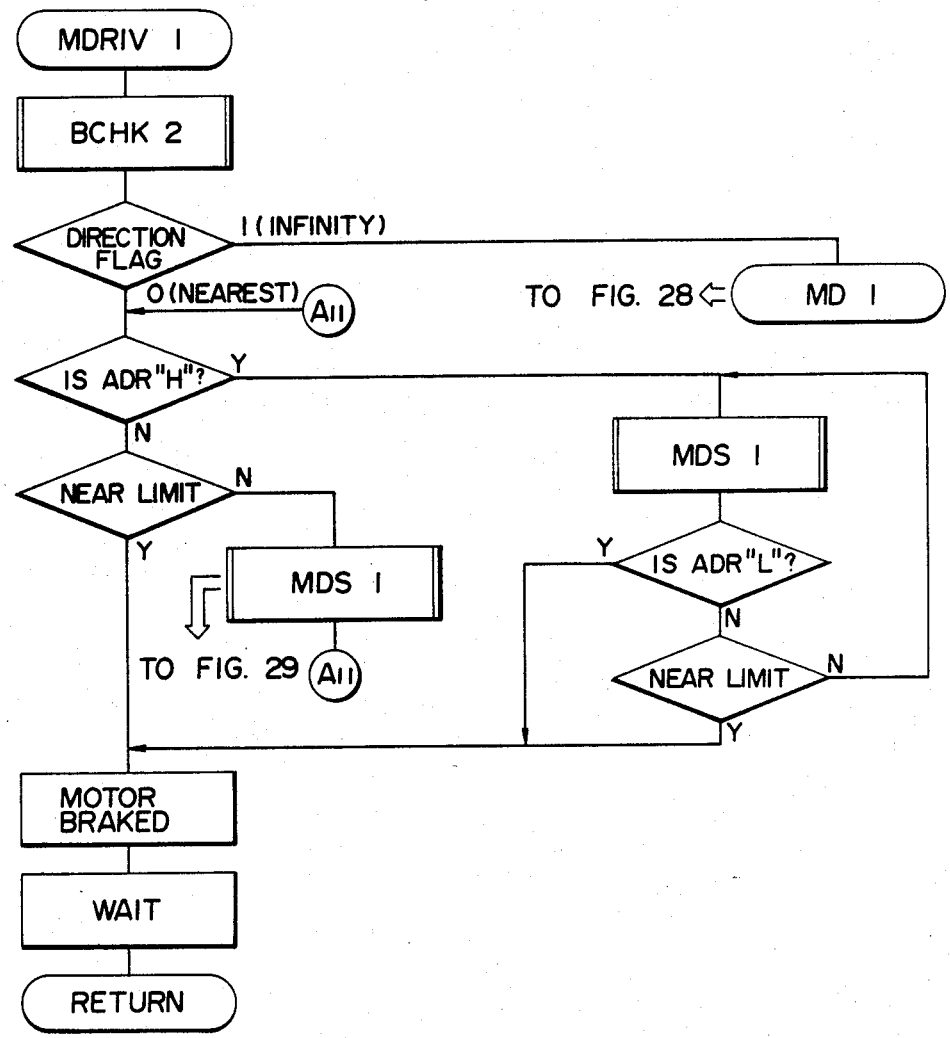

Referring to FIG. 27 to describe the motor drive operation MDRIV 1, a battery check BCHK 2 is initially performed, followed by a decision to see if the direction flag is equal to "1" (infinity) or "0" (nearest point). If the direction flag is equal to "1", the operation branches to a far direction drive routine MD1 (se FIG. 28) to be described later. If the direction flag is equal to "0", a decision is made to see if an output from the ADR switch circuit 71 (hereafter referred to as an "ADR output") is at its "H" level. If the ADR output is at its "L" level, the motor is braked if the near limit is reached and if the near limit is not reached, 1ADR drive operation MDS 1 (see FIG. 29) occurs in a near direction or a direction toward the nearest point, followed by returning to $A_{11}$. If the ADR output is at its "H" level, the MDS 1 operation is repeated until the ADR output changes to its "L" level or until the near limit is reached, whereupon the motor is braked, followed by a time delay (wait) and a return to the main program.

Figure 29:
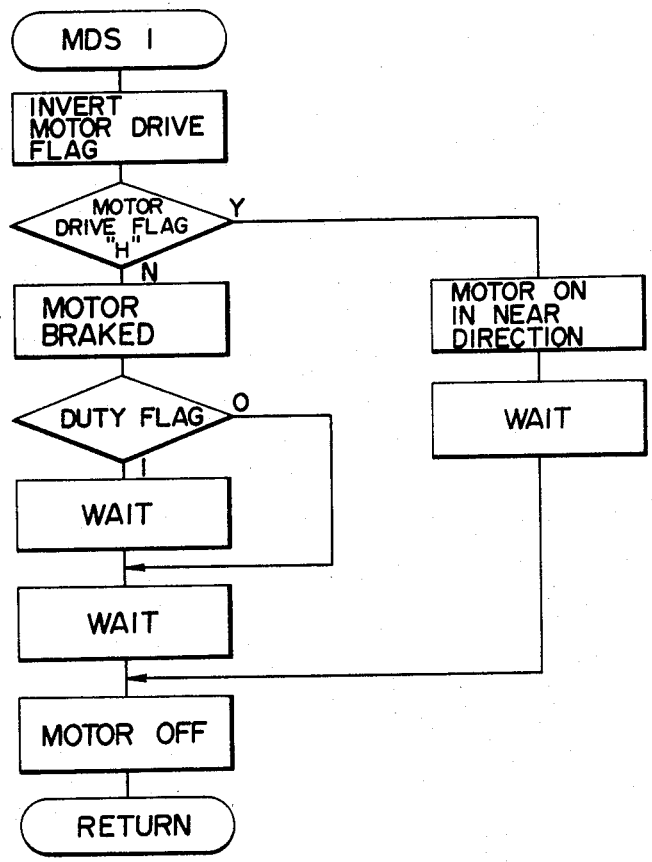

Referring to FIG. 29, 1ADR drive operation MDS 1 in the near direction is illustrated. A motor drive flag is initially inverted, and a decision is made to see if the motor drive flag is or is not at its "H" level. Assuming that the motor drive flag is at its "H" level, for example, the motor 23 is driven in the near direction, followed by a time delay (wait) and then turned off to return. The MDS 1 operation is repeated until the ADR output changes to its "L" level in FIG. 27, so that during the second operation, the motor drive flag will be at its "L" level, thus applying a braking effort to the motor. A decision is then made to see if DUTY flag is equal to "1" or "0". If it is equal to "1", this means that $V_H > V_{BAT}$, so that after double wait steps, the motor is turned off. If the flag is equal to "0", this means that $V_H \leq V_{BAT}$, so that after a single wait step, the motor is turned off. In this manner, the duty cycle of the motor depends on the voltage of the battery 75, thus applying the brake for different time intervals. To summarize, in the MDRIV 1 operation shown in FIG. 12, the motor is repeatedly turned on and off to effect MDS 1 operation toward the nearest point to complete a drive corresponding to 1ADR.

As a result of the described operations, when the pushbutton 16A for P.F. UP is operated a single time in FIG. 1, the distance ring 9 rotates through a small angle in a direction toward the nearest point, each time producing a sound in the oscillation 1 mode. When the pushbutton 16A continues to be depressed, the distance ring 9 continuously rotates. When the near limit is reached, sound is produced in the oscillation 2 mode, giving the near limit warning to a user while simultaneously applying a braking effort to the motor to stop the rotation of the distance ring 9.

Returning to FIG. 12, when the switches 143 and 144 are both off or P.F. UP and P.F. DN are both off, an exit is made through $A_1$ if REL (release) signal is applied. If such signal is not applied, a power off condition is established. When the switch 143 is off while the switch 144 is on, the distance ring 9 rotates in the far direction, namely, a direction toward the infinity, thus branching to an infinity limit check routine FLCHK 1 shown in FIG. 13.

Figure 13:
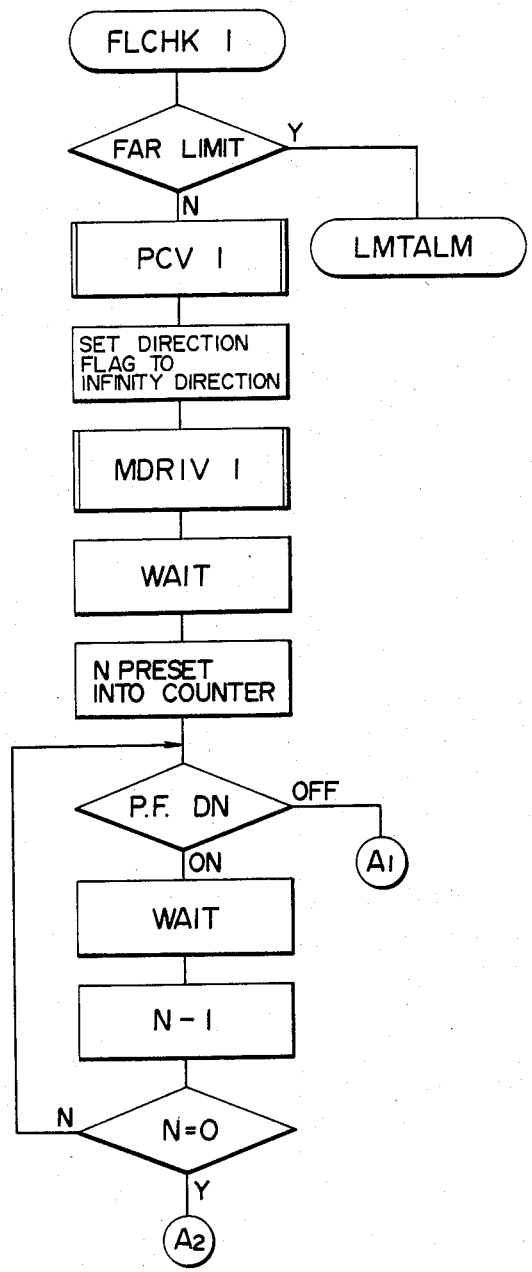
Figure 14:
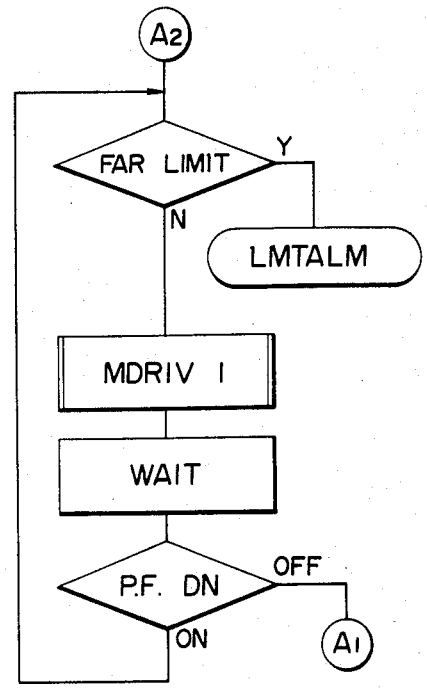
Figure 28:
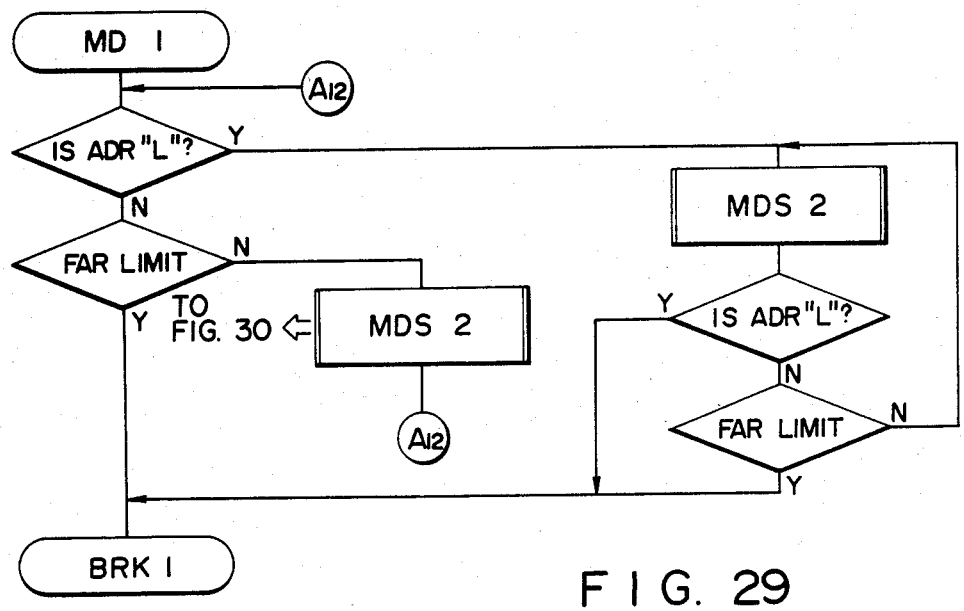

In the FLCHK 1 routine shown in FIG. 13, a decision is initially made to see if far limit is reached. If the far limit is reached, the limit warning LMTALM is given. However, if the far limit is not reached, sound is produced in the oscillation 1 mode by PCV 1 operation, and the direction flag is set to "1" (infinity). Subsequently, the program branches to the motor drive operation MDRIV 1. As shown in FIG. 28, the MDRIV 1 operation in this instance represents a programmed far direction drive operation MD 1. Accordingly, a decision is initially made to see if the ADR output is at its "L" level. If the ADR output is at its "H" level, indicating that the far limit is reached, a braking operation BRK 1 takes place. If the far limit is not reached, a far direction 1ADR drive operation MDS 2 (see FIG. 30) takes place, thereafter returning to $A_{12}$. If the ADR output is at its "L" level and changes to its "H" level after the far direction 1ADR drive MDS 2, a decision is made to see if the far limit is reached. If the far limit is reached, the braking operation BRK 1 takes place. If the far limit is not reached, MDS 2 operation is effected until the ADR output changes to its "L" level, whereupon the braking operation is performed.

A wait step follows the MDRIV 1 operation, and a count N is preset in the software counter 190. Subsequently, if the switch 144 is off, the operation returns through $A_1$, and if the switch 144 is on, a wait step and a decrementing step $(N-1)$ follow. Such process is repeated until $N=0$. Upon reaching $N=0$, a decision is made to see if the far limit is reached. If the far limit is reached, a warning is given by LMTALM. Conversely, if the far limit is not reached, MDRIV 1 operation followed by a wait step is repeated until the far limit is reached, as long as the switch 144 remains on.

Thus it will be seen that when the pushbutton 16B for P.F. DN shown in FIG. 1 is operated, the single operation causes the distance ring 9 to rotate through a small angle in the far direction, each time producing a sound in the oscillation 1 mode. When the pushbutton 16B continues to be depressed, the distance ring 9 rotates continuously, and when the far limit is reached, sound is produced in the oscillation 2 mode, giving the far limit warning and simultaneously applying a braking effort to the motor to stop the distance ring 9.

Figure 30:
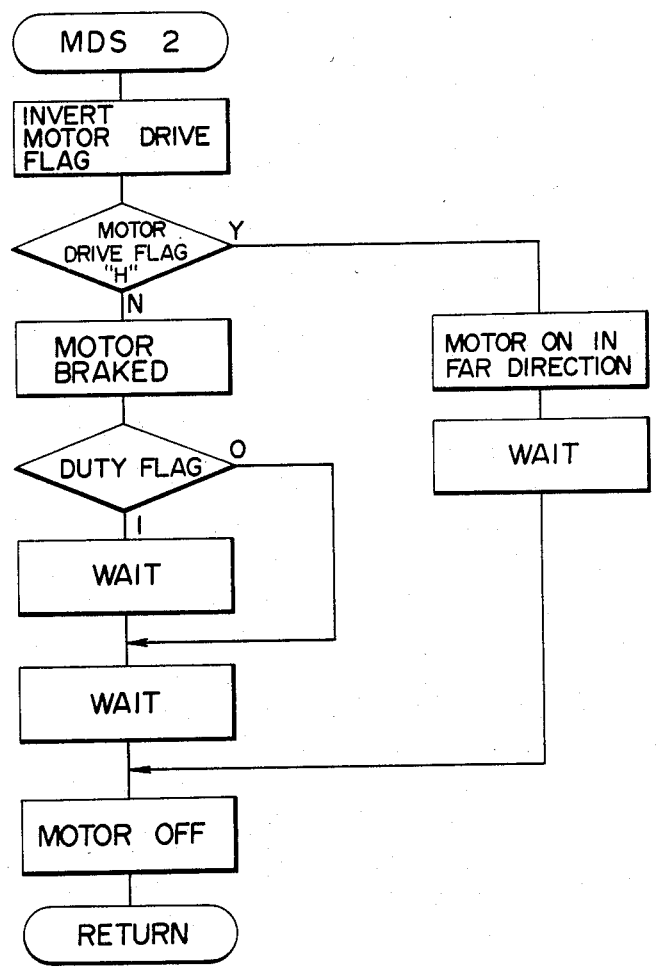

Considering the far direction 1ADR drive MDS 2 which is part of the far direction drive MD 1, it will be seen with reference to FIG. 30 that the motor drive flag is initially inverted, followed by a decision of the flag, in the similar manner as during the near direction 1ADR drive MDS 1. When the motor drive flag is at its "H" level, the motor 23 is driven in the far direction, and is then deenergized after a wait step. When the motor drive flag is at its "L" level, the motor 23 is braked. If DUTY flag is equal to "1" at this time, double wait steps follow before the motor 23 is turned off. If this flag is equal to "0", the motor 23 is deenergized after a single wait step. Thus, the time interval during which the braking effort is applied depends on the battery monitor voltage $V_{BAT}$ during the far direction drive as well.

Figure 17:
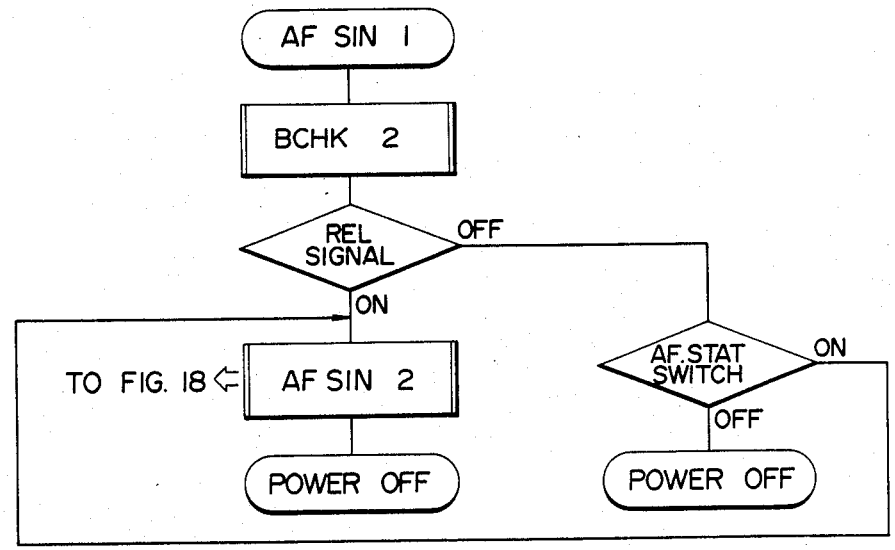

(3) When SIN. AF (single "auto-focus") mode is selected, it will be seen from FIG. 10 that a program AFSIN 1 shown in FIG. 17 is performed. In the AFSIN 1 program, an initial step of battery check BCHK 2 is followed by a decision to see if REL signal is on or off. If the signal is on, AFSIN 2 operation shown in FIG. 18 follows and then the power off condition is established. On the contrary, when REL signal is off, if the pushbuttons 16A, 16B for AF. STAT or the switches 143, 144 are off, the power off condition is immediately established while if one of the switches 143, 144 is on, the power off condition is established after completing AFSIN 2 operation.

ASFIN 2 operation will now be described with reference to FIG. 18. As shown, an AFSIN 3 operation (see FIG. 20) initially takes place, and then a decision is made to see if an LL (low light) flag is equal to "1" or "0". If the flag is equal to "1", indicating a low light condition, the first and the second LED 154 and 155 of the warning display 67 are both turned on to give a low light warning. If the flag is equal to "0", indicating the absence of a low light condition, a decision is made to see if an AF status flag is or is not equal to "0". If the AF status flag is not equal to "0", this means that one of a near distance flag, an object movement flag and a low contrast flag is equal to "1", and hence the PCV 2 warning operation is performed to give an acoustical warning for the near distance, the movement of an object and a low contrast, respectively, followed by a return. It is to be understood that such warning is given by the warning display 67. If the AF status flag is equal to "0", PCV 1 operation takes place to produce sound, indicating to a user that a normal condition prevails, followed by a WIND operation before the return. The WIND operation produces an output which energizes a winder (or a motor drive unit) if the latter is connected, as shown in FIG. 19.

Figure 18:
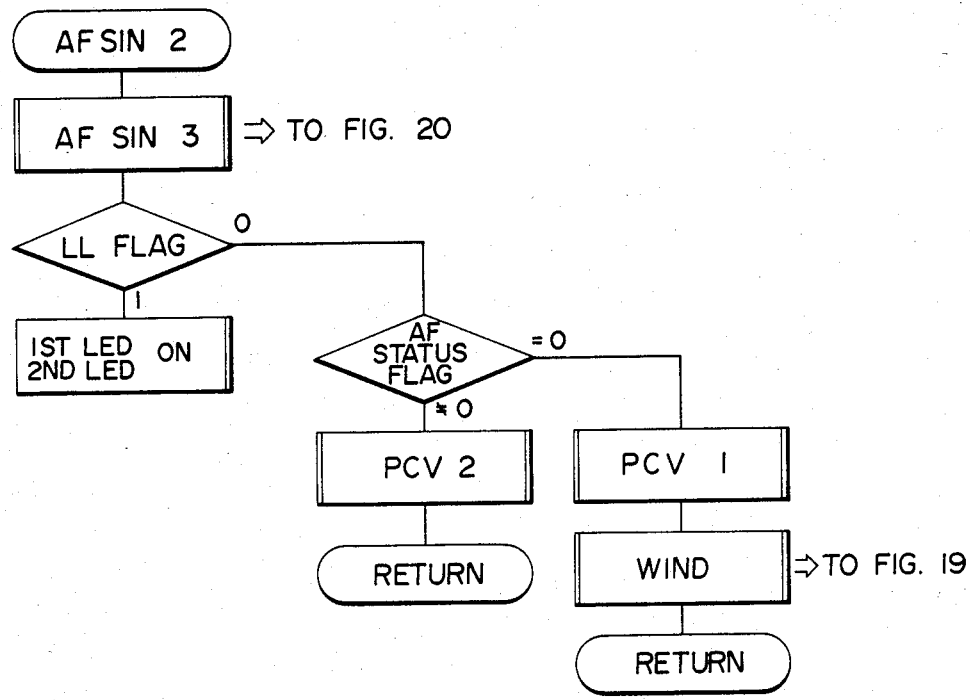
Figure 19:
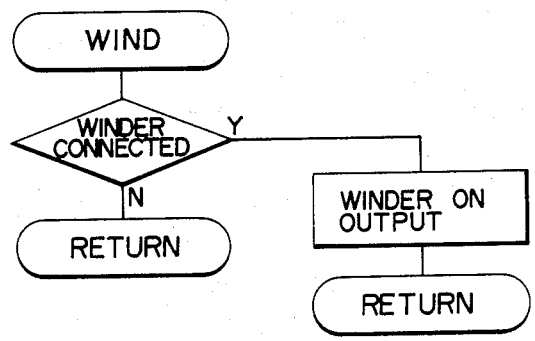
Figure 20:
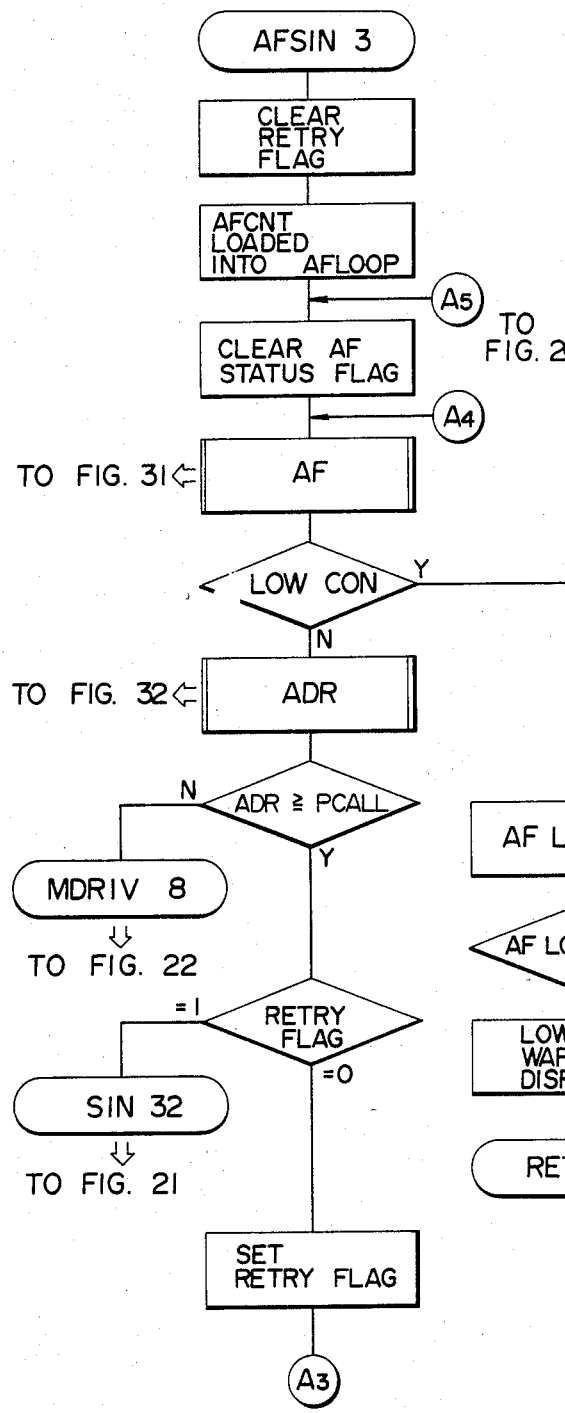
Figure 31:
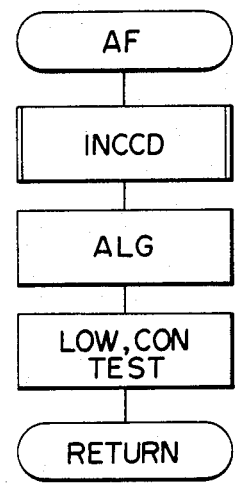
Figure 32:
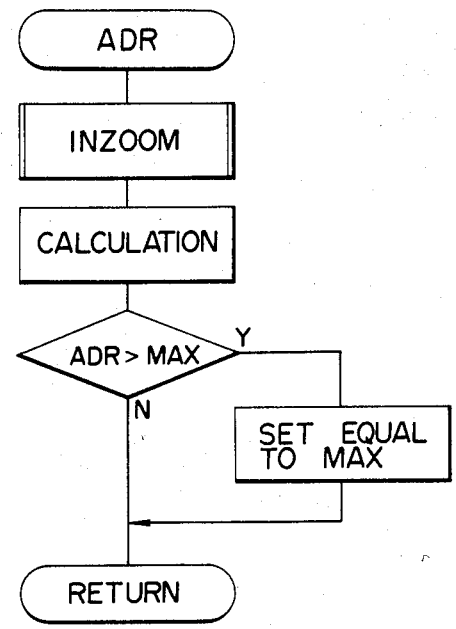

The AFSIN 3 operation shown in FIG. 18 is illustrated in greater detail in FIG. 20 where an RETRY flag is initially cleared, followed by presetting an AF count into an AF loop. Subsequently, the AF status flag is cleared, and an AF routine takes place in order to perform a distance measurement. The programmed AF operation is shown in detail in FIG. 31 where it will be seen that a CCD output from the in-focus sensor 28, after its conversion into digital form, is fed into CPU 61 (INCCD), and is subject to an AF algorithm, the execution of which determines the magnitude of a defocussing. A low contrast test is also performed. The routine then returns to FIG. 20. If a low contrast condition is determined, the count in the AF loop is decremented by 1, returning through $A_5$. This process is repeated until the count in the AF loop reaches 0, whereupon a warning display is given to indicate the low contrast. This warning display is given by LED 156. If the low contrast condition is not determined, an ADR operation shown in FIG. 32 is performed. It will be apparent from FIG. 32 that the ADR operation comprises feeding an output from the zoom information detector 42, after its A/D conversion, into CPU 61 (INZOOM), and calculating the number of ADR's through which the motor 23 (distance ring 9) should be driven in consideration of the zoom data. If an ADR value thus calculated is less than a maximum value MAX, such value is directly used. On the contrary, if the calculated ADR value is greater than MAX, the ADR value is forcibly set equal to MAX. Subsequently, the ADR value is compared against a PCALL value.

The PCALL value represents a threshold used to determine if an "auto-focus" is a result of a distance measurement of very high accuracy, and is defined in terms of a number of pulses which is required to correct a defocus Δd measured from the focal plane to the high accuracy region. If ADR<PCALL, the motor is driven at a low pulse rate through MDRIV 8 operation shown in FIG. 22. If ADR≧PCALL, the RETRY flag is set since it has been equal to "0" during the calculation for the first distance measurement, then going to $A_3$ shown in FIG. 21 to store the current ADR value. The motor is then driven at a high rate by an MDRIV 4 operation shown in FIG. 24 and to be described later. The count in the AF loop is decremented by 1 to return through $A_4$, again calculating the ADR value on the basis of the distance measurement AF. Since RETRY flag is now equal to "1", the operation transfers to SIN 32. By repeating such operation, the current ADR value is compared against the previous ADR value in the SIN 32 routine. If the current ADR value is equal to or greater than the previous ADR value, this means that the focussing operation of the taking lens is incapable of following the speed of movement of an object being photographed, thus setting the object movement flag to give a warning concerning the movement of the object. This warning is given in the warning display 67 by the emission of light from LED 154. It should further be noted that the inability to bring the object being photographed into focus also causes a turn-off of the motor by turning off the power supplied to the motor. Noting FIG. 21, when the current ADR value is equal to or greater than the previous ADR value are completed, the Object Movement Flag and Display of Object Movement are completed, followed by a return.

The program, during the routine shown in FIG. 17, subsequently advances to the AFSIN 2 routine shown in FIG. 18. The low light (LL Flag) not being set causes examination of the AF Status Flag. Since the AF Status Flag was previously set (FIG. 21), the PCV2 routine is then performed, followed by a POWER OFF step (see FIG. 17). Thus, when the AF Status Flag condition indicates that the object movement flag has been set (FIG. 21), a warning operation PCV 2 (FIG. 34) is performed followed by a turn-off of the power (POWER OFF—FIG. 17) which removes power from the drive motor. If the current ADR value is less than the previous ADR value, a sequence of operations beginning with the block MDRIV 4 is repeated until the inequality ADR<PCALL applies. It is to be understood that a decision made to give a warning display concerning the movement of an object being photographed is not limited to the comparison of the current and the previous ADR value as mentioned above, but may be based on the comparison of the current ADR value against one-half the previous ADR value so that the warning display is made unless the current value is within 50% of the previous ADR value.

Figure 22:
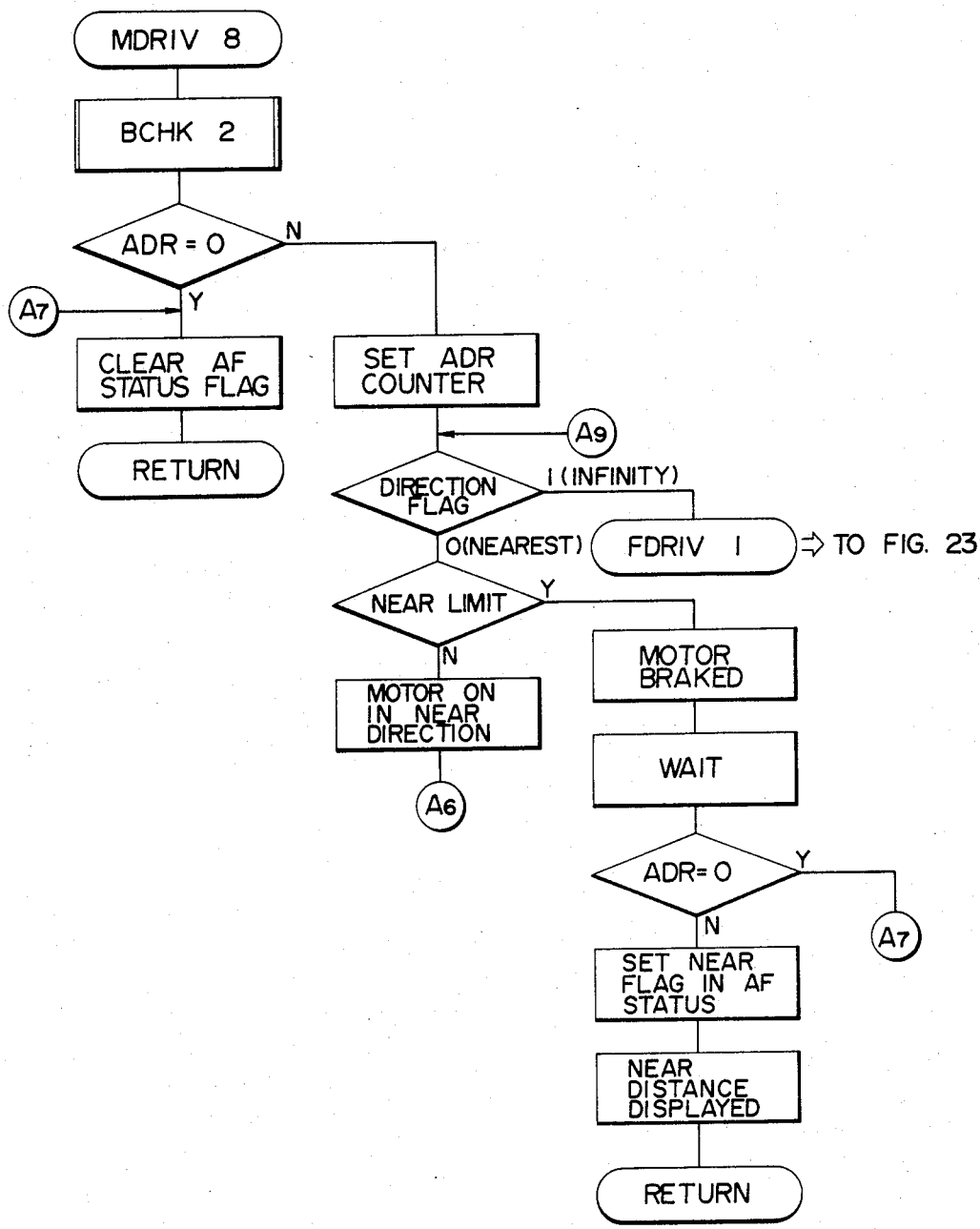

Considering the MDRIV 8 operation which is used to drive the motor at a low pulse rate during the AFSIN 3 routine, it will be seen from FIG. 22 that the operation starts with a battery check BCHK 2, followed by a decision to see if the ADR value is equal to "0". If the ADR value is equal to 0, the AF status flag is cleared, followed by a return. If the ADR value is not equal to "0", this value is loaded into the ADR counter 190. Subsequently, a decision is made to see the content of the direction flag. If it is equal to "0", indicating a direction toward the nearest point, the motor 23 is driven in a direction toward the nearest point. If the direction flag is equal to "1", indicating a direction toward the infinity, the operation transfers to an FDRIV 1 routine, thus driving the motor in the far direction. As the motor 23 is driven, each 1ADR pulse input from the ADR switch 71 is decremented in a hardware manner from the ADR value that has been loaded into the ADR counter 190. If the direction flag is equal to "0" and the near limit is reached, the motor 23 is braked and after a wait step, the operation returns through $A_7$ to clear the AF status flag when the ADR value becomes equal to 0. If the ADR value is not equal to 0, a near distance flag contained within the AF status flag is set, giving a near distance warning within the warning display 67 by means of LED 155.

Figure 23:
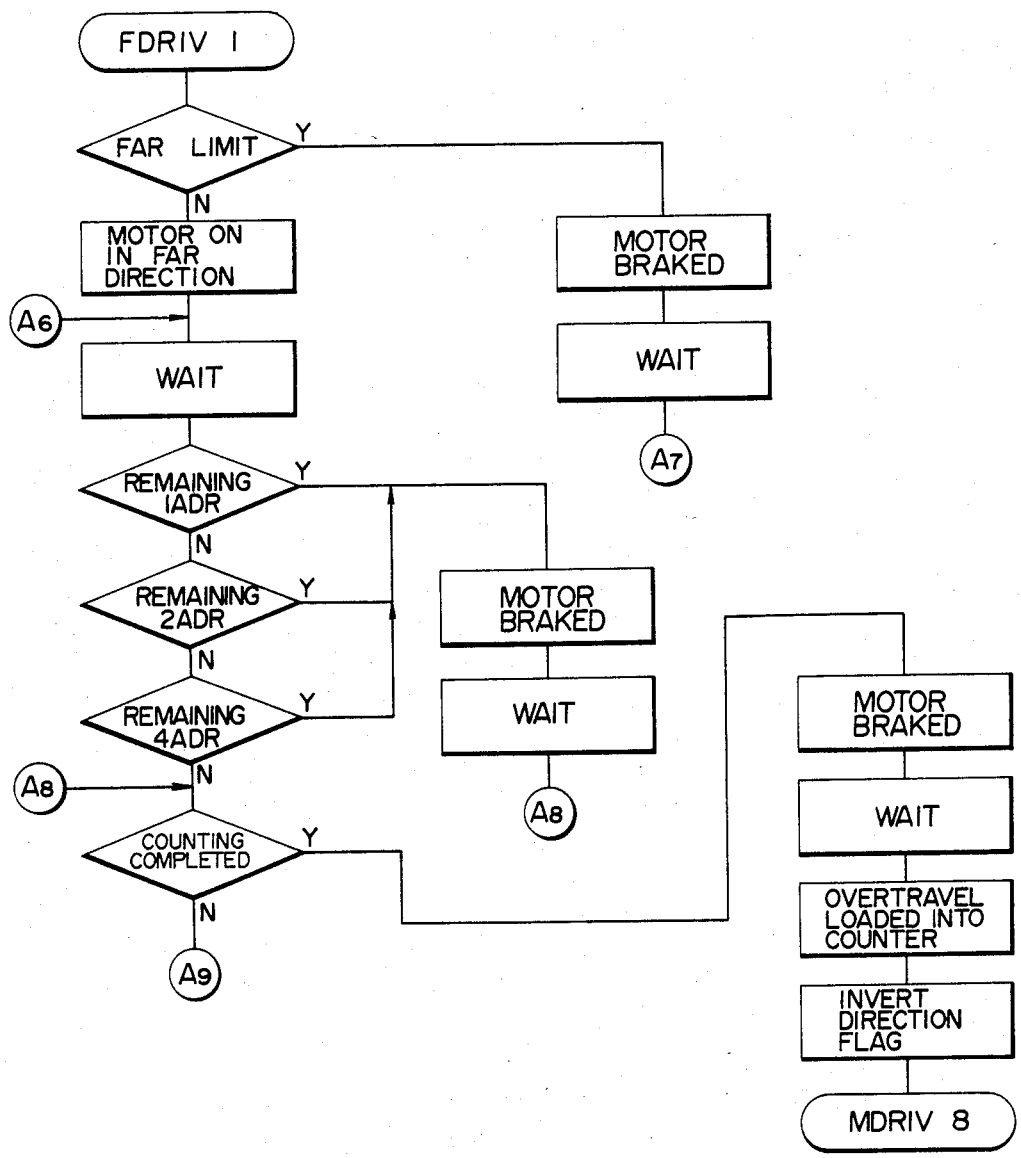

When the direction flag is equal to "1", the operation transfers to FDRIV 1 (far direction drive). As shown in FIG. 23, in this routine, if the far limit is reached, the motor is braked, and after a wait step, a return is made through $A_7$ to the routine shown in FIG. 22, whereupon the AF status flag is cleared. If the far limit is not reached, the motor is driven in the far direction, and after a wait step, the operation returns to $A_9$ in FIG. 22 if the remaining ADR value is equal to or greater than 5ADR to drive the motor further in the far direction. If the remaining ADR value is equal to 4, the motor is braked, and after a wait step, the operation goes to $A_8$. The motor is driven in the far direction until the counting ends. If the remaining ADR value is equal to 2 or 1ADR, the motor is similarly braked and is driven at a low pulse rate. When the count of the ADR value which has been loaded into the ADR counter 190 has been counted down, the motor brake is activated. After a wait step, if there is any overshoot, the magnitude of such overshoot is loaded into the ADR counter 190, and the direction flag is inverted to drive the motor according to the MDRIV 8 operation.

If the direction flag is equal to "0" and the motor is driven in the near direction during the MDRIV 8 operation, the operation transfers to $A_6$ in FIG. 23, so that the motor is driven in the near direction until the remaining ADR value becomes equal to 4, in the similar manner as when the motor is driven in the far direction, and when the remaining value is equal to 4ADR, 2ADR or 1ADR, the motor is intermittently braked to decrease its speed, and comes to a stop when the count becomes equal to 0. If there is any overshoot, the direction flag is inverted to perform the MDRIV 8 operation in the similar manner as mentioned above.

Figure 21:
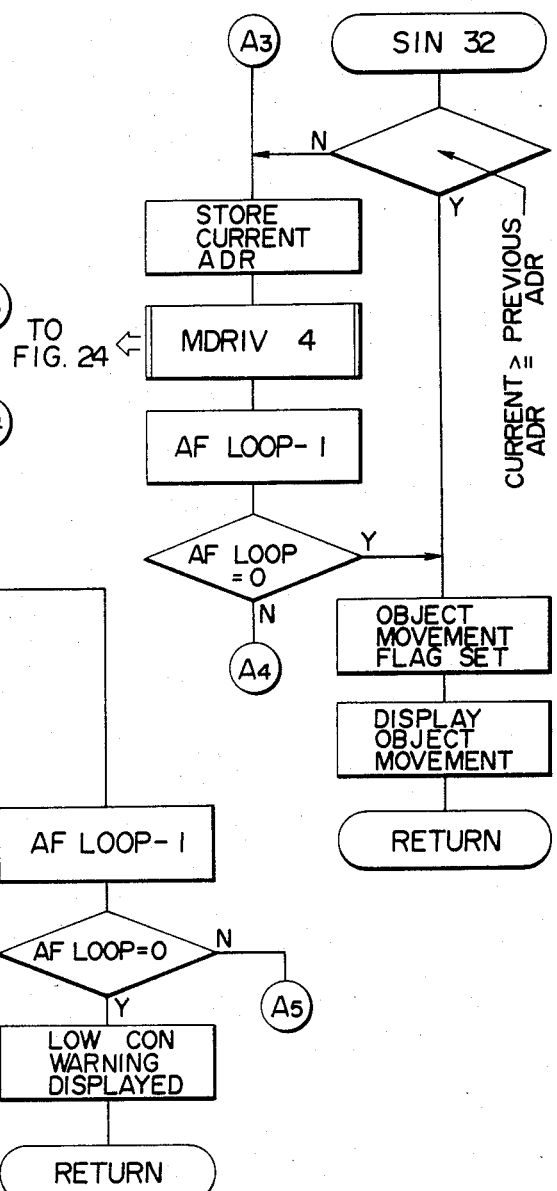
Figure 24:
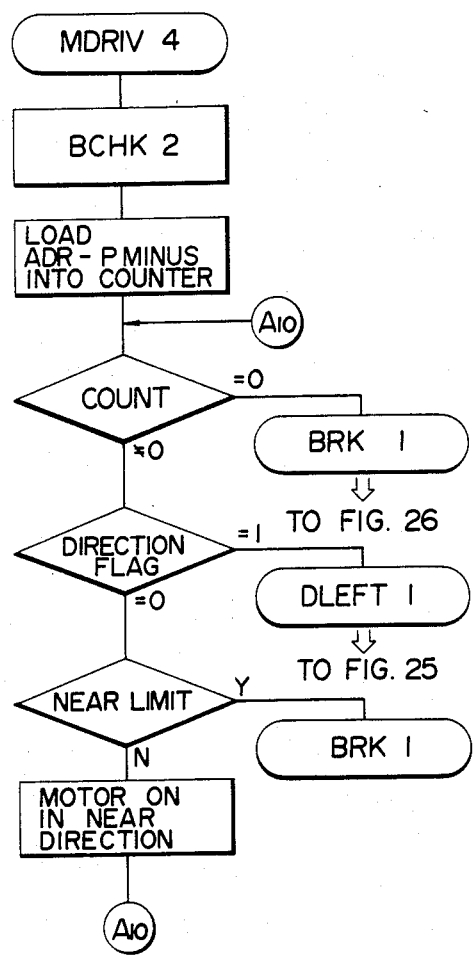
Figure 26:
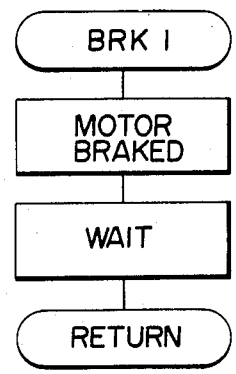

The detail of the MDRIV 4 operation shown in FIG. 21 is illustrated in FIG. 24. Initially a battery check BCHK 2 is made, and a stored ADR value from which P minus value is subtracted is loaded into the ADR counter 190. The P minus value represents a prediction value which is determined in consideration of an overshoot. If the value loaded into the ADR counter 190 is unequal to 0, a decision of the direction flag is made. If the direction flag is equal to "0" (near direction), the motor is driven in the near direction. As the motor is driven in the near direction and the count in the ADR counter 190 becomes equal to 0, a braking operation BRK 1 shown in FIG. 26 takes place, braking the motor 23 to cease the drive applied to the lens. If the count in the counter 190 does not become equal to 0, but the near limit is reached, the motor is also braked. If the direction flag is equal to "1" (far direction), the operation transfers to a programmed operation of a far direction limit check DLEFT 1.

Figure 25:
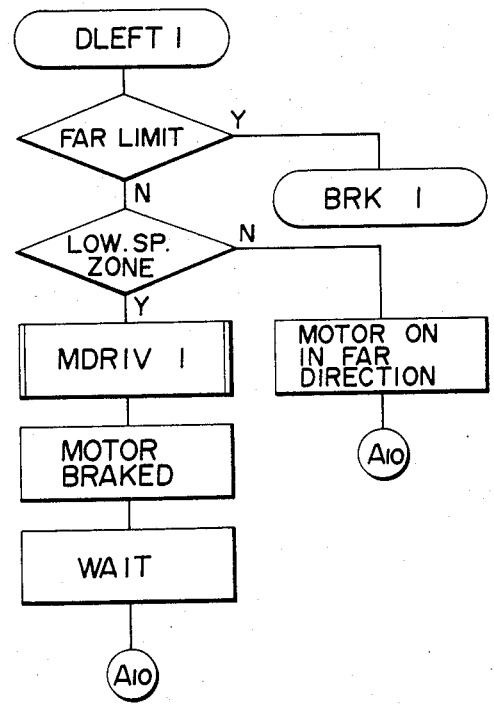

In the far direction limit check operation DLEFT 1, as shown in FIG. 25, a decision is initially made to see if the far limit is reached. If the far limit is reached, a braking operation BRK 1 takes place. If the far limit is not reached, a decision is made to see if the taking lens is in its low rate zone (a zone corresponding to the position Pf shown in FIG. 5), in terms of Gray code signal supplied from the zone switches 38 (145) and 39 (146). If it is not in the low rate zone, the motor 23 is further driven in the far direction and returns through $A_{10}$. When the count in the counter 190 becomes equal to 0, the BRK 1 operation takes place to cease the rotation of the motor 23. Accordingly, the taking lens is driven toward the infinity, and the drive applied to the taking lens is changed from the high rate to the low rate when the zone corresponding to the position Pf is reached, thus braking the taking lens so that it can be stopped smoothly at the position p∞.

Figure 35:
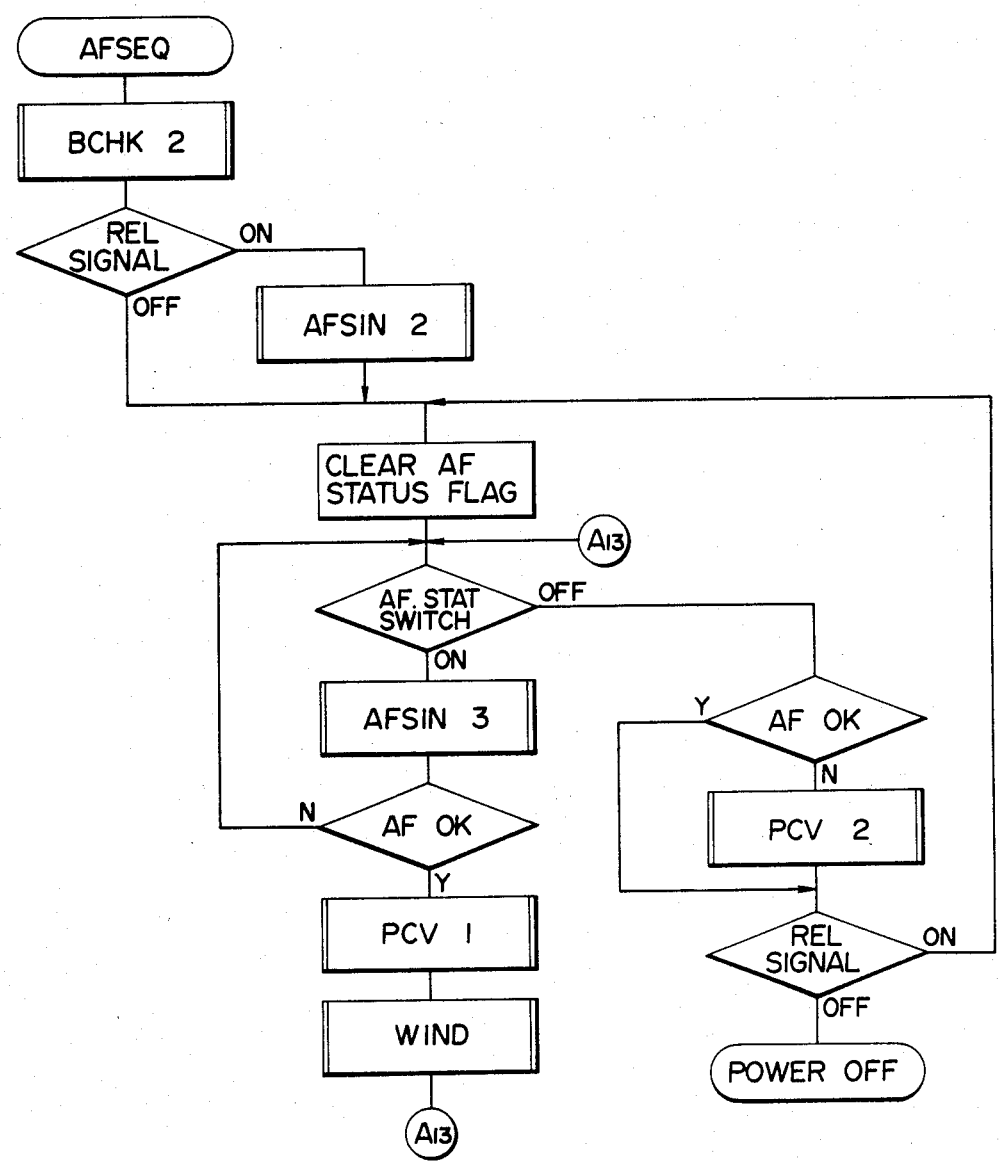

(4) When SEQ. AF (sequence "auto-focus") mode is selected, it will be apparent from FIG. 10 that the operation as indicated by an AFSEQ routine shown in FIG. 35 takes place. In the AFSEQ routine, a battery check BCHK 2 is initially made, followed by a decision to see if the REL signal is on or off. If it is on, the operation transfers to the AFSIN 2 (see FIG. 18) routine. Thus, during the SEQ. AF mode, the presence of a release signal from the camera causes an operation to take place in the SIN. AF mode. In the absence of the REL signal or after the AFSIN 2 operation has taken place, the AF status flag is cleared and either one of AF. STAT switches 143, 144 being turned on causes the AFSIN 3 (see FIG. 20) operation to take place. Subsequently, a check is made to ascertain if the AF status flag is entirely cleared, including the low contrast, the near distance, the object movement and the low contrast flag, and if they are cleared, a decision of an in-focus OK is rendered, enabling the PCV 1 operation, that is, producing a sound in the oscillation 1 mode, to inform a user that an in-focus has been attained, and also enabling the WIND operation. The operation then returns through $A_{13}$. Accordingly, the focussing operation takes place continuously during the time either one of the switches 143, 144 remains on, and the sound is produced each time the in-focus condition is reached, successively delivering a trigger output to the winder if the latter is connected.

When the AF. STAT switches 143, 144 are both off, the in-focus OK check is again made, and if the in-focus OK is recognized, a decision is made to see whether the REL signal is on or off. If this signal is off, the power off condition is established. If the in-focus OK is not recognized after turning the switches 143, 144 off, the PCV 2 operation takes place, thus producing the sound in the oscillation 2 mode to give a warning to a user establishing the power off condition.

What is claimed is:

1. A lens barrel comprising
a motor for moving a taking lens;
means for producing zone signals including an extremity signal indicating that the taking lens has reached an extremity region toward the infinity or the nearest point and a close-to-extremity signal indicating that the taking lens has reached a region which is adjacent to the extremity region;
and means for changing the drive to the motor to a low rate in response to the close-to-extremity signal.

2. A lens barrel according to claim 1 in which said means for producing the zone signals activates extremity warning means for giving a warning in response to the extremity signal.

3. A lens barrel according to claim 1 in which means responsive to said means for producing the zone signals is capable of stopping the motor by detecting the occurrence of the extremity signal.

4. A lens barrel according to claim 1 in which said means for producing the zone signals comprises a conductive pattern formed on the peripheral surface of a movably mounted distance ring which is driven for rotation by the motor which moves the taking lens, and a plurality of conductive contacts disposed for sliding contact with the conductive pattern.

5. A lens barrel according to claim 4 in which three conductive contacts are provided, a combination of a first and a third contact forming a first zone switch, and a combination of a second and a third contact forming a second zone switch, the third contact being a common contact, the conductive pattern being configured such that an angular position of the distance ring can be represented by a Gray code in terms of the on and off conditions of the first and the second zone switch.

6. A lens barrel comprising
a motor for moving a taking lens;
distance measuring means for repeatedly measuring a distance to an object being photographed;
automatic focus adjusting means operable in an "auto-focus" mode to cause the motor to move the taking lens into an in-focus position in response to an output from the distance measuring means;

and warning means operative to determine if a travel of the taking lens responsive to an output from the distance measuring means during a current measurement is by a given amount greater than a travel of the taking lens responsive to an output from the distance measuring means during a previous measurement, and responsive thereto by giving a warning concerning the movement of an object being photographed.

7. A lens barrel comprising
a motor for moving a taking lens;
distance measuring means for measuring the distance to an object being photographed;
automatic focus adjusting means operable in an "auto-focus" mode to cause the motor to move the taking lens into an in-focus position in response to an output from the distance measuring means;
mode changing means for selecting a power focus mode in which the motor is driven to move the taking lens to any desired position and the "auto-focus" mode;
and an operating member used in common in both modes, the operating member being operable during the power focus mode to initiate the movement of the taking lens under the drive from the motor and operable in the "auto-focus" mode to initiate movement of the taking lens into the in-focus position under the drive from the motor.

8. A lens barrel comprising
a motor for moving a taking lens;
distance measuring means for measuring a distance to an object being photographed;
automatic focus adjusting means operable in an "auto-focus" mode to cause the motor to move the taking lens into an in-focus position in response to an output from the distance measuring means;
mode changing means for selecting a sequence "auto-focus" mode which enables the automatic focus adjusting means to operate continuously to adjust the focus and a single "auto-focus" mode in which a single focus adjustment is made;
and an operating member used in common in both modes, the operating member being operable to initiate a movement of the taking lens into the in-focus position under the drive from the motor during both the sequence and the single "auto-focus" mode.

9. A lens barrel according to claim 8 in which when the sequence "auto-focus" mode is established by the mode changing means, the application of a release signal from an associated camera causes the mode to be automatically changed to the single "auto-focus" mode.

10. A lens barrel according to claim 6 further including means responsive to said warning means for interrupting said motor.

11. A lens barrel comprising:
a motor for moving a taking lens;
an operating member selectively energizing the motor for initiating a movement of the taking lens as driven by the motor;
end position determining means for determining when the lens barrel has reached one of its extreme positions;
means responsive to said end position determining means and said operating member for allowing the motor to be repeatedly driven in incremental steps when the operating member is continuously operated and the lens barrel is not in its extreme position; and
means responsive to said operating member for driving the motor to rotate through a small predetermined angle comprised of a total of said incremental steps when the operating member is operated a single time and released.

12. A lens barrel accordin to claim 11, said means for driving the motor further including means for detecting movement of the taking lens ring through a small angle by operation of said motor for adjusting the taking lens, the detecting means comprising a conductive pattern in the form of comb-teeth having a close pitch and formed on the peripheral surface of a distance ring which is driven for rotation by the motor which moves the taking lens, and a conductive contact disposed in sliding engagement with the conductive pattern, the conductive pattern and the contact forming a switch which is turned on and off to produce a pulse in response to the rotation of the distance ring.

13. A lens barrel according to claim 11 further comprising means for braking the motor after each incremental step.

14. The lens barrel according to claim 13 further comprising means responsive to said braking means and the level of the battery supplying power to the motor for controlling the length of a delay period before restarting the motor as a function of the battery level.

15. A lens barrel according to claim 11 in which said means for driving the motor enables the motor to be repeatedly driven when said operating member is continuously operated after a termination of a predetermined time interval from a rotation of the motor through said small predetermined angle responsive to said operating member.

* * * * *